(12) United States Patent
Shu et al.

(10) Patent No.: US 12,356,491 B2
(45) Date of Patent: Jul. 8, 2025

(54) SESSION MANAGEMENT METHOD, APPARATUS, AND SYSTEM

(71) Applicant: Huawei Technologies Co., Ltd., Shenzhen (CN)

(72) Inventors: Lin Shu, Reading (GB); Chengchen Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 17/994,649

(22) Filed: Nov. 28, 2022

(65) Prior Publication Data

US 2023/0093339 A1    Mar. 23, 2023

Related U.S. Application Data

(63) Continuation of application No. 16/952,632, filed on Nov. 19, 2020, now Pat. No. 11,528,770, which is a
(Continued)

(30) Foreign Application Priority Data

May 22, 2018   (CN) .......................... 201810496331.7

(51) Int. Cl.
    *H04W 76/25*   (2018.01)
    *H04W 8/08*    (2009.01)
    *H04W 48/16*   (2009.01)

(52) U.S. Cl.
    CPC ............. *H04W 76/25* (2018.02); *H04W 8/08* (2013.01); *H04W 48/16* (2013.01)

(58) Field of Classification Search
    CPC ..... H04W 48/16; H04W 76/10; H04W 76/25; H04W 76/27; H04W 8/08
    See application file for complete search history.

(56) References Cited

U.S. PATENT DOCUMENTS 10,277,415 B2 *   4/2019   Zhang ................... H04L 63/065
2005/0041578 A1 * 2/2005   Huotari .................... H04L 9/40
                                                        370/229
(Continued)

FOREIGN PATENT DOCUMENTS

CA       2598378 A1    2/2008
CN       102065143 A   5/2011
(Continued)

OTHER PUBLICATIONS

Intel et al., "Clarification on single outstanding Service Request," SA WG2 Meeting #127, S2-183156, Apr. 16-20, 2018, Sanya, P.R. China, 18 pages.
(Continued)

*Primary Examiner* — Awet Haile
(74) *Attorney, Agent, or Firm* — Conley Rose, P.C.

(57) ABSTRACT

A session management method performed by a session management network element includes receiving a first request message, where the first request message is used to request to establish a first session for a terminal, determining to establish the first session as an always-on session, where the always-on session is a session for which user-plane resources are activated when the terminal is transitioned from an idle mode to a connected mode, and sending a first response message to the terminal, where the first response message is used to indicate that the session management network element accepts to establish the first session, the first response message comprises first indication information, and the first indication information is used to indicate that the first session is an always-on session.

21 Claims, 9 Drawing Sheets

Related U.S. Application Data continuation of application No. PCT/CN2019/087664, filed on May 20, 2019.

(56) References Cited

U.S. PATENT DOCUMENTS

| | | | |
|---|---|---|---|
| 2006/0229094 | A1 | 10/2006 | Huh et al. |
| 2006/0235974 | A1 | 10/2006 | Ueda |
| 2008/0049741 | A1 | 2/2008 | Wirtanen et al. |
| 2013/0143559 | A1* | 6/2013 | Nishida ............... H04W 76/27 455/435.1 |
| 2016/0014088 | A1* | 1/2016 | Maekawa ............ H04L 63/029 726/12 |
| 2016/0212638 | A1* | 7/2016 | Jain ...................... H04W 72/20 |
| 2017/0353978 | A1 | 12/2017 | Ulinskas |
| 2018/0115891 | A1 | 4/2018 | Kim et al. |
| 2018/0270778 | A1 | 9/2018 | Bharatia |
| 2018/0324646 | A1 | 11/2018 | Lee et al. |
| 2019/0053104 | A1 | 2/2019 | Qiao et al. |
| 2019/0069327 | A1* | 2/2019 | Kim ........................ H04W 4/24 |
| 2019/0364541 | A1 | 11/2019 | Ryu |
| 2019/0394684 | A1 | 12/2019 | Li et al. |
| 2020/0137675 | A1 | 4/2020 | Park et al. |
| 2021/0153286 | A1 | 5/2021 | Park et al. |

FOREIGN PATENT DOCUMENTS

| | | | |
|---|---|---|---|
| CN | 103888230 | A | 6/2014 |
| CN | 104737619 | A | 6/2015 |
| CN | 107623906 | A | 1/2018 |
| JP | 2008541501 | A | 11/2008 |
| WO | 2017142170 | A1 | 8/2017 |
| WO | 2017142171 | A1 | 8/2017 |

OTHER PUBLICATIONS

U.S. Appl. No. 62/521,385, filed Jun. 17, 2017. (Priority Application of US2020/0137675A1 Park, et al.).

3GPP TS 23.502 V15.1.0, "3rd Generation Partnership Project; Technical Specification Group Services and System Aspects; Procedures for the 5G System; Stage 2 (Release 15)," Mar. 2018, 285 pages.

3GPP TS 24.501 V1.1.1, "3rd Generation Partnership Project; Technical Specification Group Core Network and Terminals; Non-Access-Stratum (NAS) protocol for 5G System (5GS); Stage 3 (Release 15)," May 2018, 297 pages.

C1-181370, Samsung, "Service Request procedure handling," 3GPP Tsg-Ct WG1 Meeting #109, Montreal (Canada), Feb. 26-Mar. 2, 2018, 7 pages.

C1-182334, Samsung, "Disc of 5G SR in comparison with legacy SR," 3GPP TSG CT WG1 Meeting #110, Kunming (P.R. of China), Apr. 16-20, 2018, 5 pages.

C1-182335, Samsung, "Discussion on KPIs in 5G," 3GPP TSG CT WG1 Meeting #110, Kunming (P.R. of China), Apr. 16-20, 2018, 4 pages.

C1-182708, Samsung et al., "SR in 5G—Alt 2," 3GPP TSG-CT WG1 Meeting #110, Kunming (P.R. of China), Apr. 16-20, 2018, 9 pages.

C1-183111, Samsung R&D Institute UK, "AMF determination that UE is in LADN service area," 3GPP TSG-CT WG1 Meeting #111, Osaka (Japan), May 21-25, 2018, 7 pages.

S2-185030, Samsung, "Discussion on network control of always-on PDU session," SA WG2 Meeting #127bis, May 28 Jun. 1, 2018, Newport Beach, USA, 2 pages.

\* cited by examiner

SESSION MANAGEMENT METHOD, APPARATUS, AND SYSTEM

CROSS-REFERENCE TO RELATED APPLICATIONS

This is a continuation of U.S. App. Ser. No. 16/952,632 filed on Nov. 19, 2020, which is a continuation of Int'l Patent App. No. PCT/CN2019/087664 filed on May 20, 2019, which claims priority to Chinese Patent App. No. 201810496331.7 filed on May 22, 2018, all of which are incorporated by reference.

FIELD

This application relates to the communications field, and more specifically, to a session management method, apparatus, and system in the communications field.

BACKGROUND

In a fifth-generation (5G) mobile communications system, a service request (SR) procedure is used by a terminal in an idle mode to request to establish a signaling connection to an access and mobility management function (AMF), or may be used by a terminal in an idle mode or a connected mode to activate corresponding user plane resources for an established protocol data unit (PDU) session. When an SR procedure is being executed, if the terminal needs to request a new service, the terminal can perform a new SR procedure only after a previous SR procedure is complete. Currently, a concurrent SR procedure is not allowed in a 3rd generation partnership project (3GPP) standard.

The 5G aims to provide a ubiquitous access network to provide access services for terminals of a plurality of service types, including a terminal of an enhanced mobile broadband (eMBB) type, a terminal of massive internet of things (MIoT) type, and a terminal of an ultra-reliable and low latency communications (uRLLC) type. Because SR procedures cannot be processed concurrently, when a terminal currently has initiated an SR procedure for a normal service, but the SR procedure is not complete, and the terminal needs to initiate an SR procedure for another latency-sensitive service, for example, a uRLLC service, a multimedia priority service (MPS), and a mission critical service (MCS), if the SR procedure for another latency-sensitive service waits until the current SR procedure is complete, a key performance indicator (KPI) of the latency-sensitive service is severely affected.

To resolve the foregoing problem, the 3GPP currently defines an always-on PDU session. In this session, user plane resources need to be activated when a terminal is switched from an idle mode to a connected mode. For the service that is very sensitive to a latency, the terminal may locally set a PDU session established for the service to an always-on PDU session. For the always-on PDU session, each time the terminal is switched from an idle mode to a connected mode, the terminal requests a network side to activate corresponding user plane network resources for the PDU session, including a data radio bearer (DRB). In this method, provided that a PDU session with a higher priority needs to transmit data, the PDU session does not need to queue for requesting a network resource, and can directly transmit the data. However, because the terminal locally manages an always-on PDU session, user plane network resources may be maliciously consumed by the terminal, how to reduce network resources is a technical problem that urgently needs to be resolved.

SUMMARY

This application provides a session management method, apparatus, and system, to help avoid malicious consumption of user plane network resources by a terminal, thereby reducing network resources.

According to a first aspect, a session management method is provided, including receiving, by a session management network element, a first request message, where the first request message is used to request to establish a first session for a terminal, determining, by the session management network element, to establish the first session as an always-on session, where the always-on session is a session for which user-plane resources are activated when the terminal is transitioned from an idle mode to a connected mode, and then sending, by the session management network element, a first response message to the terminal, where the first response message is used to indicate that the session management network element accepts to establish the first session, the first response message carries first indication information, and the first indication information is used to indicate that the first session is an always-on session.

Optionally, after determining to establish the first session as an always-on session, the session management network element may mark the first session as an always-on session. Likewise, when determining to establish the first session as an always-on session, the terminal may also mark the session as an always-on session. This is not limited in this embodiment of this application.

According to the session management method in this embodiment of this application, the session management network element receives the first request message from the terminal used to request to establish the session, and determines, based on an actual situation, to establish the always-on session for the terminal. This can flexibly manage a procedure of establishing the always-on session by a network side, and helps avoid unnecessary consumption of network resources, thereby improving system performance.

It should be understood that the first session may be specifically a PDU session, the first request message may be specifically a PDU session establishment request message, and the first response message may be specifically a PDU session establishment response message. However, it may be understood that the PDU session is merely a specific example. This is not limited in the embodiments of this application. In addition, signaling interaction between the terminal and the session management network element may be direct or indirect, in other words, implemented through forwarding by an access network element and a mobility management network element. This is not limited in the embodiments of this application.

With reference to the first aspect, in some implementations of the first aspect, the determining, by the session management network element, to establish the first session as an always-on session is specifically determining, by the session management network element based on any one of the following information, to establish the first session as the always-on session subscription information of the terminal, policy information of the terminal, or local configuration information of the session management network element.

Specifically, the session management network element may perform determining based on the subscription information of the terminal, the policy information of the terminal, or the local configuration information of the session management network element, to determine to establish the first session that is requested by the terminal to establish as the always-on session. Optionally, the subscription information, the policy information, or the local configuration information may carry indication information used to indicate allowing establishing an always-on session for the terminal. The session management network element may determine, based on the indication information, to establish the first session that is requested by the terminal to establish as the always-on session.

It should be understood that the session management network element may perform determining by using any one of the subscription information, the policy information, or the local configuration information, or may perform comprehensive determining based on any two or three of the three pieces of information. This is not limited in the embodiments of this application.

With reference to the first aspect, in some implementations of the first aspect, the determining, by the session management network element, to establish the first session as an always-on session is specifically determining, by the session management network element based on any one of the following information, to establish the first session as the always-on session a data network name (DNN), single network slice selection assistance information (S-NSSAI), current location information of the terminal, or an access type of the terminal, where the DNN or the S-NSSAI is carried in the first request message.

Specifically, the session management network element may perform determining based on any one of the DNN, the S-NSSAI, the current location information of the terminal, or the access type of the terminal, to determine to establish the first session that is requested by the terminal to establish as the always-on session. The DNN and the S-NSSAI are carried in the first request message, and are sent by the terminal to the session management network element. The current location information of the terminal and the access type of the terminal are obtained by the session management network element from the access network element.

Optionally, the DNN, the S-NSSAI, the current location information of the terminal, or the access type of the terminal may be from the subscription information of the terminal, the policy information of the terminal, or the local configuration information of the session management network element. This is not limited in the embodiments of this application.

It should be understood that the session management network element may perform determining by using any one of the DNN, the S-NSSAI, the current location information of the terminal, or the access type of the terminal, or may perform comprehensive determining based on any quantity of pieces of information in the four pieces of information. This is not limited in the embodiments of this application. In a possible implementation, if the session management network element selects a plurality of pieces of information for determining, when all the plurality of pieces of information successfully match corresponding information allowing to establish an always-on session, the session management network element determines to establish the first session as the always-on session.

With reference to the first aspect, in some implementations of the first aspect, the local configuration information may include any one of the following information a maximum quantity of always-on sessions supported by the terminal or a maximum quantity of always-on sessions supported by the session management network element. Correspondingly, the determining, by the session management network element, to establish the first session as an always-on session is specifically, when a quantity of existing always-on sessions of the terminal is less than the maximum quantity of always-on sessions supported by the terminal, determining, by the session management network element, to establish the first session as the always-on session, or when a quantity of existing always-on sessions of the session management network element is less than the maximum quantity of always-on sessions supported by the session management network element, determining, by the session management network element, to establish the first session as the always-on session.

Optionally, the local configuration information may include not only the DNN, the S-NSSAI, the current location information of the terminal, or the access type of the terminal, but also the maximum quantity of always-on sessions supported by the terminal or the maximum quantity of always-on sessions supported by the session management network element. In this case, the session management network element may first determine whether a quantity of always-on sessions of the terminal or the session management network element is less than the maximum quantity of always-on sessions supported by the terminal or the session management network element. When the quantity of always-on sessions of the terminal or the session management network element is less than the maximum quantity of always-on sessions supported by the terminal or the session management network element, the session management network element then performs determining in combination with conditions such as the DNN, the S-NSSAI, the current location information of the terminal, or the access type of the terminal. If the quantity of always-on sessions of the terminal or the session management network element is not less than the maximum quantity of always-on sessions supported by the terminal or the session management network element, the session management network element may determine to reject to establish the first session as the always-on session.

With reference to the first aspect, in some implementations of the first aspect, the method further includes receiving, by the session management network element, second indication information, where the second indication information is used to indicate establishing the first session as an always-on session.

Specifically, the terminal may further send, to the session management network element, the second indication information used to indicate establishing the first session requested to establish as the always-on session. The second indication information may be carried in the first request message, or may be separated from the first request message and sent as two independent messages to the session management network element. This is not limited in the embodiments of this application. Usually, the terminal encapsulates the first request message in an uplink transport message for sending, for example, an uplink non-access stratum (NAS) transport message.

It should be understood that, the session management network element may determine, only when the second indication information is detected, to establish the first session as the always-on session. If the second indication information is not detected, the session management network element still performs processing according to an existing common session establishment procedure. However, this is not limited in the embodiments of this application.

With reference to the first aspect, in some implementations of the first aspect, after the sending, by the session management network element, a first response message to the terminal, the method further includes determining, by the session management network element, to update a session attribute of the first session, where the session attribute is used to indicate that the first session is an always-on session, and then sending, by the session management network element, a notification message to the terminal, where the notification message is used to notify that the session attribute of the first session has been updated to a non-always-on session.

According to the session management method in this embodiment of this application, a session attribute of an existing session is updated, so that network resources can be flexibly used. In particular, when the subscription information, the policy information, or the local configuration information changes, the session attribute of the existing session is flexibly adjusted. This helps improve resource utilization of a system, thereby improving system performance.

With reference to the first aspect, in some implementations of the first aspect, the method further includes receiving, by the session management network element, second indication information, where the second indication information is used to indicate establishing the first session as an always-on session.

According to a second aspect, another session management method is provided, including sending, by a terminal, a first request message to a session management network element, where the first request message is used to request to establish a first session for the terminal, and receiving, by the terminal, a first response message, where the first response message is used to indicate that the session management network element accepts to establish the first session, the first response message carries first indication information, the first indication information is used to indicate that the first session is an always-on session, and the always-on session is a session for which user-plane resources are activated when the terminal is transitioned from an idle mode to a connected mode.

According to the session management method in this embodiment of this application, the session management network element receives the first request message from the terminal used to request to establish the session, and determines, based on an actual situation, to establish the always-on session for the terminal. This can flexibly manage a procedure of establishing the always-on session by a network side, and helps avoid unnecessary consumption of network resources, thereby improving system performance.

With reference to the second aspect, in some implementations of the second aspect, the method further includes sending, by the terminal, second indication information to the session management network element, where the second indication information is used to indicate establishing the first session as an always-on session.

With reference to the second aspect, in some implementations of the second aspect, after the receiving, by the terminal, a first response message, the method further includes receiving, by the terminal, a notification message, where the notification message is used to notify that a session attribute of the first session has been updated to a non-always-on session.

According to a third aspect, another session management method is provided, including receiving, by a session management network element, a first request message and second indication information, where the first request message is used to request to establish a first session for a terminal, the second indication information is used to indicate establishing the first session as an always-on session, and the always-on session is a session for which user-plane resources are activated when the terminal is transitioned from an idle mode to a connected mode, determining, by the session management network element, to reject to establish the first session as an always-on session, and then sending, by the session management network element, a first response message to the terminal, where the first response message carries third indication information, and the third indication information is used to indicate that the session management network element rejects to establish the first session as an always-on session.

According to the session management method in this embodiment of this application, the session management network element receives, from the terminal, the first request message used to request to establish the session and the second indication information used to indicate establishing the session as the always-on session, and determines, based on an actual situation, to reject to establish the always-on session for the terminal. This can flexibly manage a procedure of establishing the always-on session by a network side, and helps avoid unnecessary consumption of network resources, thereby improving system performance.

With reference to the third aspect, in some implementations of the third aspect, the first response message is used to indicate that the session management network element rejects to establish the first session, and the third indication information is used to indicate that the session management network element rejects to establish the first session because the session management network element rejects to establish the first session as an always-on session. Alternatively, the first response message is used to indicate that the session management network element accepts to establish the first session, but does not accept to establish the first session as an always-on session.

With reference to the third aspect, in some implementations of the third aspect, the determining, by the session management network element, to reject to establish the first session as an always-on session is specifically determining, by the session management network element based on any one of the following information, to reject to establish the first session as the always-on session subscription information of the terminal, policy information of the terminal, or local configuration information of the session management network element.

With reference to the third aspect, in some implementations of the third aspect, the determining, by the session management network element, to reject to establish the first session as an always-on session includes determining, by the session management network element based on any one of the following information, to reject to establish the first session as the always-on session a DNN, S-NSSAI, current location information of the terminal, or an access type of the terminal, where the DNN or the S-NSSAI is carried in the first request message.

With reference to the third aspect, in some implementations of the third aspect, the local configuration information includes any one of the following information a maximum quantity of always-on sessions supported by the terminal or a maximum quantity of always-on sessions supported by the session management network element. The determining, by the session management network element, to reject to establish the first session as an always-on session includes, when a quantity of existing always-on sessions of the terminal is greater than or equal to the maximum quantity of always-on sessions supported by the terminal, determining, by the session management network element, to reject to establish the first session as the always-on session, or when a quantity of existing always-on sessions of the session management network element is greater than or equal to the maximum quantity of always-on sessions supported by the session management network element, determining, by the session management network element, to reject to establish the first session as the always-on session.

With reference to the third aspect, in some implementations of the third aspect, after the sending, by the session management network element, a first response message to the terminal, the method further includes determining, by the session management network element, to update a session attribute of the first session, where the session attribute is used to indicate that the first session is a non-always-on session, and sending, by the session management network element, a notification message to the terminal, where the notification message is used to notify that the session attribute of the first session has been updated to an always-on session.

According to a fourth aspect, another session management method is provided, including sending, by a terminal, a first request message and second indication information to a session management network element, where the first request message is used to request to establish a first session for the terminal, the second indication information is used to indicate establishing the first session as an always-on session, and the always-on session is a session for which user-plane resources are activated when the terminal is transitioned from an idle mode to a connected mode, and receiving, by the terminal, a first response message, where the first response message carries third indication information, and the third indication information is used to indicate that the session management network element rejects to establish the first session as an always-on session.

According to the session management method in this embodiment of this application, the session management network element receives, from the terminal, the first request message used to request to establish the session and the second indication information used to indicate establishing the session as the always-on session, and determines, based on an actual situation, to reject to establish the always-on session for the terminal. This can flexibly manage a procedure of establishing the always-on session by a network side, and helps avoid unnecessary consumption of network resources, thereby improving system performance.

With reference to the fourth aspect, in some implementations of the fourth aspect, the first response message is used to indicate that the session management network element rejects to establish the first session, and the third indication information is used to indicate that the session management network element rejects to establish the first session because the session management network element rejects to establish the first session as an always-on session. Alternatively, the first response message is used to indicate that the session management network element accepts to establish the first session, but does not accept to establish the first session as an always-on session.

With reference to the fourth aspect, in some implementations of the fourth aspect, after the receiving, by the terminal, a first response message, the method further includes receiving, by the terminal, a notification message, where the notification message is used to notify that a session attribute of the first session has been updated to an always-on session.

According to a fifth aspect, another session management method is provided, including receiving, by a terminal from a mobility management network element, setting information of an always-on session, and setting, by the terminal, an established first session as an always-on session based on the setting information of the always-on session, where the always-on session is a session for which user-plane resources are activated when the terminal is transitioned from an idle mode to a connected mode.

With reference to the fifth aspect, in some implementations of the fifth aspect, the receiving, by a terminal from a mobility management network element, setting information of an always-on session specifically includes sending, by the terminal, a second request message to the mobility management network element, where the second request message is used to request to register with the mobility management network element, and receiving, by the terminal, a second response message, where the second response message is used to indicate that the mobility management network element accepts registration of the terminal, and the second response message carries the setting information of the always-on session, or receiving, by the terminal, a configuration update command from the mobility management network element, where the configuration update command carries the setting information of the always-on session, or receiving, by the terminal, policy information of the terminal from the mobility management network element, where the policy information carries the setting information of the always-on session.

With reference to the fifth aspect, in some implementations of the fifth aspect, the second request message carries capability indication information of the terminal, where the capability indication information is used to indicate a capability of the terminal supporting an always-on session.

With reference to the fifth aspect, in some implementations of the fifth aspect, the setting, by the terminal, an established first session as an always-on session based on the setting information of the always-on session includes setting the established first session as the always-on session when the terminal determines that the established first session meets the setting information of the always-on session.

With reference to the fifth aspect, in some implementations of the fifth aspect, the setting information of the always-on session is any one of DNN information allowing to establish an always-on session, S-NSSAI information allowing to establish an always-on session, a location of a terminal allowing to establish an always-on session, an access type of the terminal allowing to establish an always-on session, or a service type requested by the terminal allowing to establish an always-on session.

According to a sixth aspect, another session management method is provided, including determining, by a mobility management network element, setting information of an always-on session based on any one of the following information subscription information of a terminal, policy information of the terminal, or local configuration information of the mobility management network element, and sending, by the mobility management network element, the setting information of the always-on session to the terminal.

With reference to the sixth aspect, in some implementations of the sixth aspect, the receiving, by a terminal from a mobility management network element, setting information of an always-on session specifically includes receiving, by the mobility management network element, a second request message from the terminal, where the second request message is used to request to register with the mobility management network element, and the sending, by the mobility management network element, the setting information of the always-on session to the terminal is specifically sending, by the mobility management network element, a second response message to the terminal, where the second response message is used to indicate that the mobility management network element accepts registration of the terminal, and the second response message carries the setting information of the always-on session.

With reference to the sixth aspect, in some implementations of the sixth aspect, the second request message carries capability indication information of the terminal, where the capability indication information is used to indicate a capability of the terminal supporting an always-on session, and the determining, by a mobility management network element, setting information of an always-on session is specifically, when the capability indication information indicates that the terminal supports an always-on session, determining, by the mobility management network element, the setting information of the always-on session based on any one of the following information subscription information of the terminal, policy information of the terminal, or local configuration information of the mobility management network element.

With reference to the sixth aspect, in some implementations of the sixth aspect, the setting information of the always-on session is any one of DNN information allowing to establish an always-on session, S-NSSAI information allowing to establish an always-on session, a location of a terminal allowing to establish an always-on session, an access type of the terminal allowing to establish an always-on session, or a service type requested by the terminal allowing to establish an always-on session.

According to the session management method in this embodiment of this application, the mobility management network element may notify the terminal of the setting information of the always-on session allowing the terminal to initiate an always-on session. The terminal may determine, based on the setting information of the always-on session, whether to set an existing session as an always-on session. This can further enhance control on an always-on session initiated on a terminal side, thereby effectively avoiding a waste of network resources.

According to a seventh aspect, a session management system is provided, including a mobility management network element and a session management network element, where the mobility management network element is configured to send a first request message to the session management network element, and the first request message is used to request to establish a first session for a terminal, the session management network element is configured to receive the first request message, and determine to establish the first session as an always-on session, where the always-on session is a session for which user-plane resources are activated when the terminal is transitioned from an idle mode to a connected mode, and the session management network element is configured to send a first response message to the mobility management network element, where the first response message is used to indicate that the session management network element accepts to establish the first session, the first response message carries first indication information, and the first indication information is used to indicate that the first session is an always-on session.

With reference to the seventh aspect, in some implementations of the seventh aspect, the mobility management network element is further configured to, before the mobility management network element sends the first request message to the session management network element, determine whether at least one of the following conditions is met the mobility management network element supports the always-on session, and the mobility management network element is capable of selecting the session management network element supporting the always-on session, and when the at least one condition is met, the mobility management network element sends the first request message and second indication information to the session management network element, where the second indication information is used to indicate establishing the first session as an always-on session.

According to an eighth aspect, a session management apparatus is provided, and is configured to perform the method in any one of the first aspect or the possible implementations of the first aspect. Specifically, the apparatus includes units configured to perform the method in any one of the first aspect or the possible implementations of the first aspect.

According to a ninth aspect, another apparatus is provided, and is configured to perform the method in any one of the second aspect or the possible implementations of the second aspect. Specifically, the apparatus includes units configured to perform the method in any one of the second aspect or the possible implementations of the second aspect.

According to a tenth aspect, a session management apparatus is provided, and is configured to perform the method in any one of the third aspect or the possible implementations of the third aspect. Specifically, the apparatus includes units configured to perform the method in any one of the third aspect or the possible implementations of the third aspect.

According to an eleventh aspect, another apparatus is provided, and is configured to perform the method in any one of the fourth aspect or the possible implementations of the fourth aspect. Specifically, the apparatus includes units configured to perform the method in any one of the fourth aspect or the possible implementations of the fourth aspect.

According to a twelfth aspect, a session management apparatus is provided, and is configured to perform the method in any one of the fifth aspect or the possible implementations of the fifth aspect. Specifically, the apparatus includes units configured to perform the method in any one of the fifth aspect or the possible implementations of the fifth aspect.

According to a thirteenth aspect, another apparatus is provided, and is configured to perform the method in any one of the sixth aspect or the possible implementations of the sixth aspect. Specifically, the apparatus includes units configured to perform the method in any one of the sixth aspect or the possible implementations of the sixth aspect.

According to a fourteenth aspect, another session management apparatus is provided, and the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal, so as to enable the apparatus to perform the method in any one of the first aspect or the possible implementations of the first aspect.

According to a fifteenth aspect, another apparatus is provided, and the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal, so as to enable the apparatus to perform the method in any one of the second aspect or the possible implementations of the second aspect.

According to a sixteenth aspect, another apparatus is provided, and the apparatus includes a processor. The processor is configured to, after being coupled with a memory and reading an instruction in the memory, perform, according to the instruction, the method in any one of the second aspect or the possible implementations of the second aspect.

According to a seventeenth aspect, another session management apparatus is provided, and the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal, so as to enable the apparatus to perform the method in any one of the third aspect or the possible implementations of the third aspect.

According to an eighteenth aspect, another apparatus is provided, and the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal, so as to enable the apparatus to perform the method in any one of the fourth aspect or the possible implementations of the fourth aspect.

According to a nineteenth aspect, another apparatus is provided, and the apparatus includes a processor. The processor is configured to, after being coupled with a memory and reading an instruction in the memory, perform, according to the instruction, the method in any one of the fourth aspect or the possible implementations of the fourth aspect.

According to a twentieth aspect, another session management apparatus is provided, and the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal, so as to enable the apparatus to perform the method in any one of the fifth aspect or the possible implementations of the fifth aspect.

According to a twenty-first aspect, another apparatus is provided, and the apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal, so as to enable the apparatus to perform the method in any one of the sixth aspect or the possible implementations of the sixth aspect.

According to a twenty-second aspect, another apparatus is provided, and the apparatus includes a processor. The processor is configured to, after being coupled with a memory and reading an instruction in the memory, perform, according to the instruction, the method in any one of the sixth aspect or the possible implementations of the sixth aspect.

According to a twenty-third aspect, a computer program product is provided, and the computer program product includes computer program code. When the computer program code is run by a computer, the computer is enabled to perform the method in any possible implementation of any one of the foregoing aspects.

According to a twenty-fourth aspect, a computer-readable medium is provided, and is used to store a computer program. The computer program includes an instruction used to perform the method in any possible implementation of any one of the foregoing aspects.

According to a twenty-fifth aspect, a communications chip is provided, and the communications chip stores an instruction. When the instruction runs on a computer device, the communications chip is enabled to perform the method in any possible implementation of any one of the foregoing aspects.

DETAILED DESCRIPTION

The following describes technical solutions of this application with reference to accompanying drawings.

The technical solutions of the embodiments of this application may be applied to various communications systems, such as a Global System for Mobile Communication (GSM) system, a code-division multiple access (CDMA) system, a wideband code division multiple access (WCDMA) system, a general packet radio service (GPRS), a Long-Term Evolution (LTE) system, an LTE frequency-division duplex (FDD) system, an LTE time division duplex (TDD), a Universal Mobile Telecommunications System (UMTS), a Worldwide Interoperability for Microwave Access (WiMAX) communications system, a 5G system, or a future system.

Figure 1:
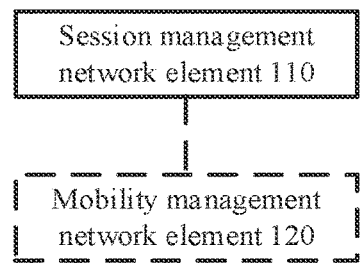
FIG. 1 is a schematic diagram of a system architecture according to an embodiment of this application.

FIG. 1 is a schematic diagram of a system architecture 100 to which an embodiment of this application is applied. As shown in FIG. 1, the system architecture 100 includes a session management network element 110. Optionally, the system architecture 100 may further include a mobility management network element 120.

The system architecture 100 may be configured to perform the session management method in the embodiments of this application.

In a possible implementation, the session management network element 110 in the system architecture 100 is specifically configured to receive a first request message, where the first request message is used to request to establish a first session for a terminal, determine to establish the first session as an always-on session, where the always-on session is a session for which user-plane resources are activated when the terminal is transitioned from an idle mode to a connected mode, and send a first response message to the terminal, where the first response message is used to indicate that the session management network element accepts to establish the first session, the first response message carries first indication information, and the first indication information is used to indicate that the first session is an always-on session. In this case, the session management network element 110 may also receive second indication information, and the second indication information is used to indicate establishing the first session as an always-on session.

In another possible implementation, the session management network element 110 in the system architecture 100 is specifically configured to receive the first request message and second indication information, where the first request message is used to request to establish the first session for the terminal, the second indication information is used to indicate establishing the first session as an always-on session, and the always-on session is a session for which user-plane resources are activated when the terminal is transitioned from an idle mode to a connected mode, determine to reject to establish the first session as an always-on session, and send a first response message to the terminal, where the first response message carries third indication information, and the third indication information is used to indicate that the session management network element rejects to establish the first session as an always-on session. In this case, the session management network element may reject to establish the first session, or may establish the first session as a non-always-on session. This is not limited herein.

In another possible implementation, the mobility management network element 120 in the system architecture 100 is specifically configured to receive the first request message and the second indication information, where the first request message is used to request to establish the first session for the terminal, the second indication information is used to indicate establishing the first session as an always-on session, and the always-on session is a session for which user-plane resources are activated when the terminal is transitioned from an idle mode to a connected mode, determine whether at least one of the following conditions is met the mobility management network element supports the always-on session, and the mobility management network element is capable of selecting the session management network element supporting the always-on session, and send the first request message and the second indication information to the session management network element when the at least one condition is met.

Therefore, in the system architecture 100, the session management network element flexibly manages a procedure of establishing the always-on session. This helps avoid unnecessary consumption of network resources to improve system performance.

Optionally, the session management network element 110 and the mobility management network element 120 in the system architecture 100 may be implemented by one device, or may be jointly implemented by a plurality of devices, or may be a functional module in a device. This is not specifically limited in the embodiments of this application. It may be understood that the foregoing functions may be network elements in a hardware device, or may be software functions running on dedicated hardware, or may be virtualization functions instantiated on a platform (for example, a cloud platform).

Optionally, the system architecture 100 may further include a terminal.

In a possible implementation, the terminal is specifically configured to send the first request message to the session management network element, where the first request message is used to request to establish the first session for the terminal, and receive the first response message, where the first response message is used to indicate that the session management network element accepts to establish the first session, the first response message carries the first indication information, the first indication information is used to indicate that the first session is an always-on session, and the always-on session is a session for which user-plane resources are activated when the terminal is transitioned from an idle mode to a connected mode.

In another possible implementation, the terminal is specifically configured to send the first request message and the second indication information to the session management network element, where the first request message is used to request to establish the first session for the terminal, the second indication information is used to indicate establishing the first session as an always-on session, and the always-on session is a session for which user-plane resources are activated when the terminal is transitioned from an idle mode to a connected mode, and receive the first response message, where the first response message carries the third indication information, and the third indication information is used to indicate that the session management network element rejects to establish the first session as an always-on session.

It should be understood that, the terminal in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal may be a cellular phone, a cordless phone, a session initiation protocol (SIP) phone, a wireless local loop (WLL) station, a personal digital assistant (PDA), a handheld device having a wireless communications function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

Figure 2:
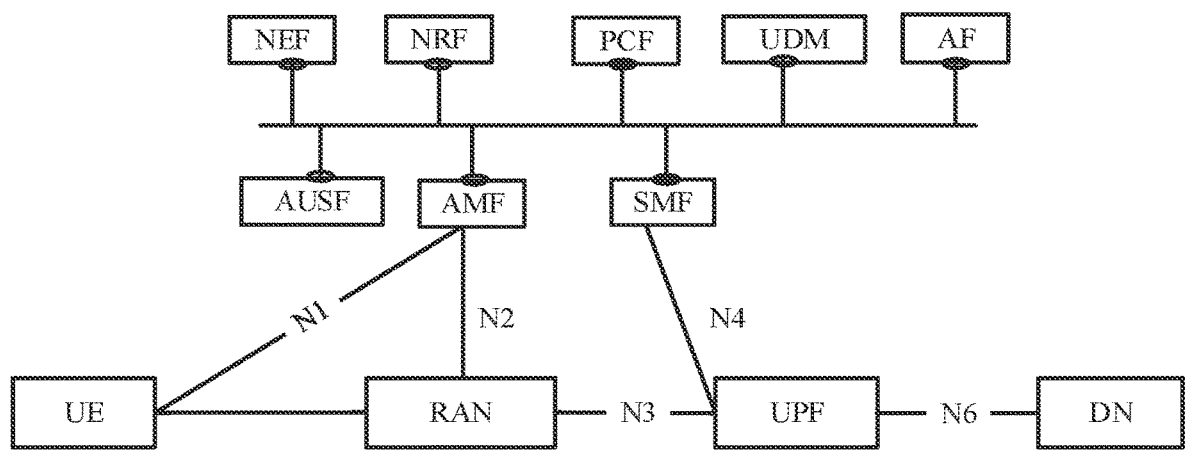
FIG. 2 is a schematic diagram of an application scenario according to an embodiment of this application.

FIG. 2 is an application scenario 200 according to an embodiment of this application. As shown in FIG. 2, the application scenario 200 may specifically include the following network elements.

1. A session management function (SMF) network element is mainly used to manage a session, allocate and manage an internet protocol (IP) address for a terminal device, select a user plane function (UPF) that can be managed, control a policy, manage a termination point of a charging function interface, notify downlink data, and the like.

2. An AMF network element is mainly used for mobility management, access management, and the like, and may be used to implement a function other than session management in functions of a mobility management entity (MME), for example, functions such as lawful interception or access authorization (or authentication).

It should be understood that, in the system architecture 100, the session management network element 110 may specifically correspond to the SMF network element in FIG. 2, and the mobility management network element 120 may specifically correspond to the AMF network element in FIG. 2.

Optionally, the application scenario 200 may further include the following.

3. A terminal.

4. A (radio) access network ((R)AN) network element is used to provide a network access function for an authorized user in a specific area, and can use transmission tunnels with different qualities based on user levels, service requirements, and the like. The (R)AN network element can manage radio resources and provide an access service for a terminal device, to forward a control signal and user data between the terminal device and a core network. The (R)AN network element may also be understood as a base station in a conventional network.

5. AUPF network element is used for packet routing and forwarding, quality of service (QoS) processing of user plane data, or the like.

6. A data network (DN) network element is used to provide a network for data transmission, for example, an internet network.

7. An authentication server function (AUSF) network element is mainly used for user authentication and the like.

8. A network exposure function (NEF) network element is used for securely exposing, to the outside, a service, a capability, and the like that are provided by a 3GPP network function.

9. A network repository function (NRF) network element is used to store description information of a network function entity and a service provided by the network function entity, and support service discovery, network element entity discovery, and the like.

10. A policy control function (PCF) network element is a unified policy framework used for instructing network behavior, and provides policy rule information and the like for control plane function network elements (such as AMF and SMF network elements).

11. A unified data management (UDM) network element is used for user identifier processing, access authentication, registration, mobility management, and the like.

12. An application function (AF) network element is used to route data affected by an application, access a NEF network element, or interact with a policy framework to perform policy control or the like.

In the application scenario 200, an N1 interface is a reference point between the terminal and the AMF. An N2 interface is a reference point between the (R)AN network element and the AMF network element, and is used to send a NAS message and the like. An N3 interface is a reference point between the (R)AN network element and the UPF network element, and is used to transmit user plane data and the like. An N4 interface is a reference point between the SMF network element and the UPF network element, and is used to transmit information such as tunnel identifier information of an N3 connection, data buffering indication information, and a downlink data notification message. An N6 interface is a reference point between the UPF network element and the DN network element, and is used to transmit user plane data and the like.

It should be understood that the application scenario 200 applied to the embodiments of this application is merely an example of a network architecture described from a perspective of a service architecture, and a network architecture applicable to the embodiments of this application is not limited thereto. Any network architecture that can implement functions of the network elements is applicable to the embodiments of this application.

It should be noted that names of interfaces between the foregoing network elements in FIG. 2 are only examples, and the interfaces may have other names in specific implementation. This is not specifically limited in the embodiments of this application.

It should be noted that names of the network elements (such as the SMF, the AF, and the UPF) included in FIG. 2 are also merely examples, and do not constitute any limitation on the functions of the network elements. In a 5G network and other future networks, the foregoing network elements may also have other names. This is not specifically limited in the embodiments of this application. For example, in a sixth generation (6G) network, some or all of the foregoing network elements may use terms in the 5G, or may use other names, or the like. This is uniformly described herein. Details are not described in the following. In addition, it should be understood that names of messages (or signaling) transmitted between the foregoing network elements are merely examples, and do not constitute any limitation on functions of the messages.

For specific working processes and beneficial effects of the network elements in the systems in FIG. 1 and FIG. 2, refer to descriptions in the following method embodiments.

Figure 3:
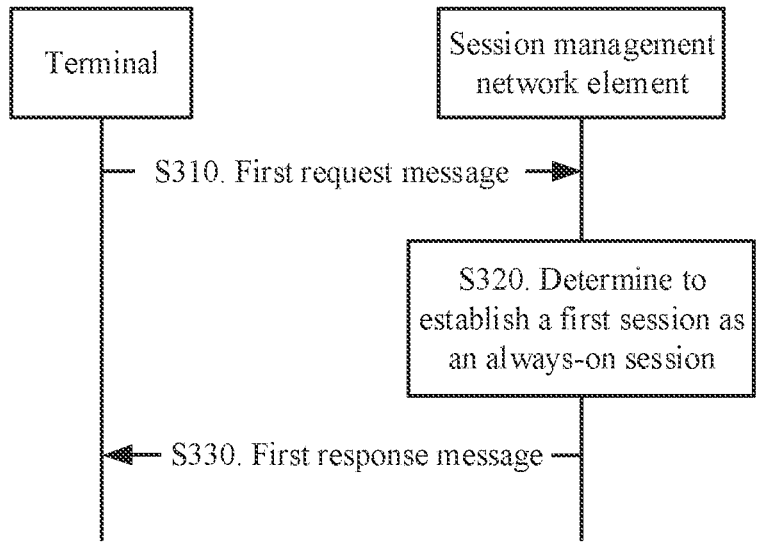
FIG. 3 is a schematic flowchart of a session management method according to an embodiment of this application.

FIG. 3 shows a schematic flowchart of a session management method 300 according to an embodiment of this application. The method 300 may be applied to the system architecture 100 shown in FIG. 1, and may be also applied to the application scenario 200 shown in FIG. 2. This is not limited in the embodiments of this application.

S310. A terminal sends a first request message to a session management network element, where the first request message is used to request to establish a first session for the terminal, and correspondingly the session management network element receives the first request message.

S320. The session management network element determines to establish the first session as an always-on session, where the always-on session is a session for which user-plane resources are activated when the terminal is transitioned from an idle mode to a connected mode.

S330. The session management network element sends a first response message to the terminal, where the first response message is used to indicate that the session management network element accepts to establish the first session, the first response message carries first indication information, and the first indication information is used to indicate that the first session is an always-on session, and correspondingly, the terminal receives the first response message.

Specifically, the terminal may send, to the session management network element, the first request message used to request to establish the first session. The session management network element receives the first request message, and determines to establish the first session as the always-on session. The session management network element sends the first response message to the terminal. The first response message is used to indicate that the session management network element accepts to establish the first session, and the first response message carries the first indication information used to indicate establishing the first session as the always-on session. After receiving the first response message sent by the session management network element, the terminal may determine to allow establishing the first session and establish the first session as the always-on session.

Optionally, after determining to establish the first session as an always-on session, the session management network element may mark the first session as the always-on session. Likewise, when determining to establish the first session as an always-on session, the terminal may also mark the session as an always-on session. This is not limited in this embodiment of this application.

According to the session management method in this embodiment of this application, the session management network element receives the first request message from the terminal used to request to establish the session, and determines, based on an actual situation, to establish the always-on session for the terminal. This can flexibly manage a procedure of establishing the always-on session by a network side, and helps avoid unnecessary consumption of network resources, thereby improving system performance.

It should be understood that the first session may be specifically a PDU session, the first request message may be specifically a PDU session establishment request message, and the first response message may be specifically a PDU session establishment response message. However, it may be understood that the PDU session is merely a specific example. This is not limited in the embodiments of this application. In addition, signaling interaction between the terminal and the session management network element may be direct or indirect, in other words, implemented through forwarding by an access network element and a mobility management network element. This is not limited in the embodiments of this application.

In an optional embodiment, that the session management network element determines to establish the first session as an always-on session is specifically determining, by the session management network element based on any one of the following information, to establish the first session as the always-on session subscription information of the terminal, policy information of the terminal, or local configuration information of the session management network element.

Specifically, the session management network element may perform determining based on the subscription information of the terminal, the policy information of the terminal, or the local configuration information of the session management network element, to determine to establish the first session that is requested by the terminal to establish as the always-on session. Optionally, the subscription information, the policy information, or the local configuration information may carry indication information used to indicate allowing establishing an always-on session for the terminal. The session management network element may determine, based on the indication information, to establish the first session that is requested by the terminal to establish as the always-on session.

It should be understood that the session management network element may perform determining by using any one of the subscription information, the policy information, or the local configuration information, or may perform comprehensive determining based on any two or three of the three pieces of information. This is not limited in the embodiments of this application.

In a possible implementation, if the session management network element performs determining only based on the subscription information, the session management network element may determine to establish the first session as the always-on session, provided that the subscription information indicates allowing establishing the always-on session for the terminal. If the session management network element performs determining in combination with the subscription information and the local configuration information, when both the subscription information and the local configuration information indicate allowing establishing the always-on session for the terminal, the session management network element may determine to establish the first session as the always-on session. Likewise, if the session management network element performs determining in combination with the subscription information, the policy information, and the local configuration information, when all the subscription information, the policy information, and the local configuration information indicate allowing establishing the always-on session, the session management network element may determine to establish the first session as the always-on session.

In an optional embodiment, that the session management network element determines to establish the first session as an always-on session includes determining, by the session management network element based on any one of the following information, to establish the first session as the always-on session a DNN, S-NSSAI, current location information of the terminal, or an access type of the terminal, where the DNN or the S-NSSAI is carried in the first request message.

Specifically, the session management network element may perform determining based on any one of the DNN, the S-NSSAI, the current location information of the terminal, or the access type of the terminal, to determine to establish the first session that is requested by the terminal to establish as the always-on session. The DNN and the S-NSSAI are carried in the first request message, and are sent by the terminal to the session management network element. The current location information of the terminal and the access type of the terminal are obtained by the session management network element from the access network element.

In a possible implementation, the session management network element may match the DNN carried in the first request message with at least one DNN that is in the session management network element and that allows establishing an always-on session. If a DNN in the at least one DNN successfully matches the DNN carried in the first request message, the session management network element may determine to establish the first session as the always-on session. Optionally, the at least one DNN may be stored in the session management network element in a form of a table, a list, or the like.

In another possible implementation, the session management network element may match the S-NSSAI carried in the first request message with at least one piece of S-NSSAI that is in the session management network element and that allows establishing an always-on session. If S-NSSAI in the at least one piece of S-NSSAI successfully matches the S-NSSAI carried in the first request message, the session management network element may determine to establish the first session as the always-on session. Optionally, the at least one piece of S-NSSAI may be stored in the session management network element in a form of a table, a list, or the like.

In another possible implementation, the session management network element may match the obtained current location information of the terminal with at least one piece of location information that is in the session management network element and that allows establishing an always-on session. If location information in the at least one piece of location information successfully matches the current location information of the terminal, the session management network element may determine to establish the first session as the always-on session. Optionally, the at least one piece of location information may be stored in the session management network element in a form of a table, a list, or the like.

In another possible implementation, the session management network element may match the obtained access type of the terminal with at least one access type that is in the session management network element and that allows establishing an always-on session. If an access type in the at least one access type successfully matches the access type of the terminal, the session management network element may determine to establish the first session as the always-on session. Optionally, the at least one access type may be stored in the session management network element in a form of a table, a list, or the like.

Optionally, the DNN, the S-NSSAI, the current location information of the terminal, or the access type of the terminal may be from the subscription information of the terminal, the policy information of the terminal, or the local configuration information of the session management network element. This is not limited in the embodiments of this application.

It should be understood that the session management network element may perform determining by using any one of the DNN, the S-NSSAI, the current location information of the terminal, or the access type of the terminal, or may perform comprehensive determining based on any quantity of pieces of information in the four pieces of information. This is not limited in the embodiments of this application. In a possible implementation, if the session management network element selects a plurality of pieces of information for determining, when all the plurality of pieces of information successfully match corresponding information allowing to establish an always-on session, the session management network element determines to establish the first session as the always-on session.

In an optional embodiment, the local configuration information includes any one of the following information a maximum quantity of always-on sessions supported by the terminal or a maximum quantity of always-on sessions supported by the session management network element. Correspondingly, that the session management network element determines to establish the first session as an always-on session includes, when a quantity of existing always-on sessions of the terminal is less than the maximum quantity of always-on sessions supported by the terminal, determining, by the session management network element, to establish the first session as the always-on session, or when a quantity of existing always-on sessions of the session management network element is less than the maximum quantity of always-on sessions supported by the session management network element, determining, by the session management network element, to establish the first session as the always-on session.

Specifically, the local configuration information may include the maximum quantity of always-on sessions supported by the terminal. The session management network element may compare the quantity of existing always-on sessions of the terminal with the maximum quantity of always-on sessions supported by the terminal. If the quantity of existing always-on sessions of the terminal is less than the maximum quantity of always-on sessions supported by the terminal, the session management network element may determine to establish the first session as the always-on session.

The local configuration information may include the maximum quantity of always-on sessions supported by the session management network element. The session management network element may compare the quantity of existing always-on sessions of the session management network element with the maximum quantity of always-on sessions supported by the session management network element. If the quantity of existing always-on sessions of the session management network element is less than the maximum quantity of always-on sessions supported by the session management network element, the session management network element may determine to establish the first session as the always-on session.

Likewise, if the session management network element determines both the foregoing two conditions, when both the foregoing two conditions are met, the session management network element may determine to establish the first session as the always-on session.

Optionally, the local configuration information may include not only the DNN, the S-NSSAI, the current location information of the terminal, or the access type of the terminal, but also the maximum quantity of always-on sessions supported by the terminal or the maximum quantity of always-on sessions supported by the session management network element. In this case, the session management network element may first determine whether a quantity of always-on sessions of the terminal or the session management network element is less than the maximum quantity of always-on sessions supported by the terminal or the session management network element. When the quantity of always-on sessions of the terminal or the session management network element is less than the maximum quantity of always-on sessions supported by the terminal or the session management network element, the session management network element then performs determining in combination with conditions such as the DNN, the S-NSSAI, the current location information of the terminal, or the access type of the terminal. If the quantity of always-on sessions of the terminal or the session management network element is not less than the maximum quantity of always-on sessions supported by the terminal or the session management network element, the session management network element may determine to reject to establish the first session as the always-on session.

In an optional embodiment, the method further includes sending, by the terminal, second indication information to the session management network element, where the second indication information is used to indicate establishing the first session as an always-on session, and correspondingly receiving, by the session management network element, the second indication information.

Specifically, the terminal may further send, to the session management network element, the second indication information used to indicate establishing the first session requested to establish as the always-on session. The second indication information may be carried in the first request message, or may be separated from the first request message and sent as two independent messages to the session management network element. This is not limited in the embodiments of this application.

Optionally, the session management network element may determine, only when the second indication information is detected, to establish the first session as the always-on session. If the second indication information is not detected, the session management network element still performs processing according to an existing common session establishment procedure. However, this is not limited in the embodiments of this application.

Usually, the terminal encapsulates the first request message in an uplink transport message for sending, for example, an uplink NAS transport message. For the foregoing two different cases, the network side may use different processing manners. The following describes the processing manners in detail.

Case 1. If the second indication information is carried in the first request message, the mobility management network element receives an uplink transport message of the terminal, and cannot identify the second indication information in the first request message. Therefore, the mobility management network element forwards the uplink transport message, and the session management network element decapsulates the uplink transport message, to obtain other information and the second indication information in the first request message.

Case 2. If the second indication information and the first request message are two independent messages, and the terminal encapsulates the second indication information and the first request message together into an uplink transport message, the mobility management network element receives the uplink transport message from the terminal, and can obtain the second indication information from the uplink transport message. When the mobility management network element determines, based on the second indication information, that the first session requested by the terminal to establish is the always-on session, the method further includes determining, by the mobility management network element, whether at least one of the following conditions is met the mobility management network element supports an always-on session, and the mobility management network element is capable of selecting the session management network element supporting the always-on session, where when the at least one condition is met, the mobility management network element sends the first request message and the second indication information to the session management network element.

It should be understood that, for the case 2, the mobility management network element may select one of the foregoing two conditions for determining, or the two conditions for determining. When determining that both the conditions are met, the mobility management network element allows the first session to be established as the always-on session, and continues to forward the first request message and the second indication information to the session management network element. If there is a condition not met, the mobility management network element may reject to establish the first session as the always-on session. In this case, the mobility management network element may reject to establish the first session, and send, to the terminal, a response message indicating that the first session is rejected to establish, to interrupt a session establishment procedure. The response message may carry a cause value, and the cause value is used to indicate that the first session is rejected to be established because the mobility management network element rejects to establish the first session as the always-on session. Alternatively, the mobility management network element may establish the first session as a common session, and only send the first request message to the session management network element, without sending the second indication information.

In an optional embodiment, after the session management network element sends a first response message to the terminal, the method further includes determining, by the session management network element, to update a session attribute of the first session, where the session attribute is used to indicate that the first session is an always-on session, sending, by the session management network element, a notification message to the terminal, where the notification message is used to notify that the session attribute of the first session has been updated to a non-always-on session, and correspondingly, receiving, by the terminal, the notification message.

Specifically, after the session management network element establishes the first session as the always-on session, the session management network element may further update the session attribute of the first session, in other words, update the session attribute of the first session from the always-on session to the non-always-on session. Optionally, the session management network element may delete an identifier used to identify the first session as an always-on session. The session management network element sends, to the terminal, the notification message used to notify that the session attribute of the first session has been updated to the non-always-on session. The terminal receives the notification message, to determine that the first session has been updated to the non-always-on session. Optionally, the terminal may delete an identifier used to identify the first session as an always-on session.

According to the session management method in this embodiment of this application, a session attribute of an existing session is updated, so that network resources can be flexibly used. In particular, when the subscription information, the policy information, or the local configuration information changes, the session attribute of the existing session is flexibly adjusted. This helps improve resource utilization of a system, thereby improving system performance.

Figure 4:
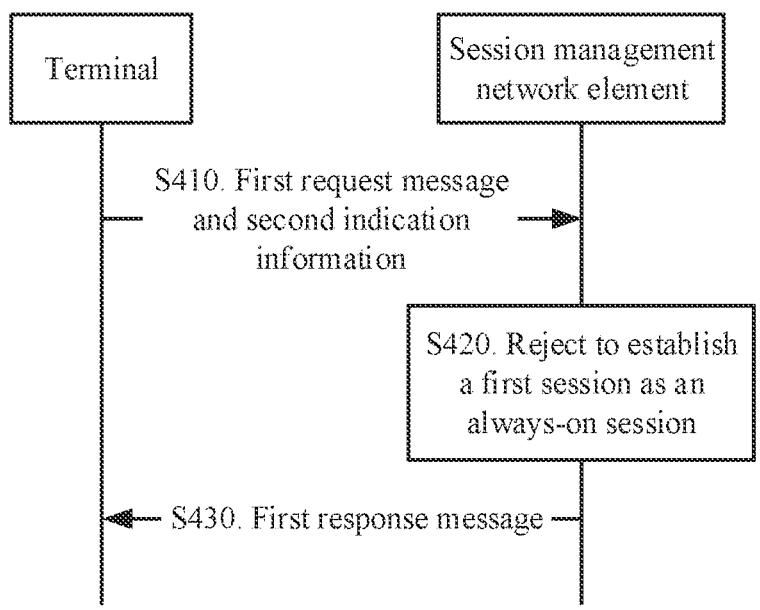
FIG. 4 is a schematic flowchart of another session management method according to an embodiment of this application.

FIG. 4 is a schematic flowchart of a session management method 400 according to an embodiment of this application. The method 400 may be applied to the system architecture 100 shown in FIG. 1, and may be also applied to the application scenario 200 shown in FIG. 2. This is not limited in the embodiments of this application.

S410. A terminal sends a first request message and second indication information to a session management network element, where the first request message is used to request to establish a first session for the terminal, the second indication information is used to indicate establishing the first session as an always-on session, and the always-on session is a session for which user-plane resources are activated when the terminal is transitioned from an idle mode to a connected mode, and correspondingly the session management network element receives the first request message and the second indication information.

S420. The session management network element determines to reject to establish the first session as an always-on session.

S430. The session management network element sends a first response message to the terminal, where the first response message carries third indication information, and the third indication information is used to instruct the session management network element to reject to establish the first session as an always-on session, and correspondingly, the terminal receives the first response message.

Specifically, the terminal may send, to the session management network element, the first request message used to request to establish the first session and the second indication information used to indicate establishing the first session as the always-on session. The session management network element receives the first request message and the second indication information. The session management network element performs determining to determine to reject to establish the first session as the always-on session, and sends the first response message to the terminal. The first response message is used to indicate that the session management network element rejects to establish the first session, and the first response message carries a cause value used to indicate that the session management network element rejects to establish the first session, in other words, indicate that the session management network element rejects to establish the first session as the always-on session. After receiving the first response message sent by the session management network element, the terminal may determine that the first session is not allowed to be established as the always-on session.

According to the session management method in this embodiment of this application, the session management network element receives, from the terminal, the first request message used to request to establish the session and the second indication information used to indicate establishing the session as the always-on session, and determines, based on an actual situation, to reject to establish the always-on session for the terminal. This can flexibly manage a procedure of establishing the always-on session by a network side, and helps avoid unnecessary consumption of network resources, thereby improving system performance.

It should be understood that the first session may be specifically a PDU session, the first request message may be specifically a PDU session establishment request message, and the first response message may be specifically a PDU session establishment response message. However, this is not limited in the embodiments of this application. In addition, signaling interaction between the terminal and the session management network element may be direct or indirect, in other words, implemented through forwarding by an access network element and a mobility management network element. This is not limited in the embodiments of this application.

In an optional embodiment, the first response message is used to indicate that the session management network element rejects to establish the first session, and the third indication information is used to indicate that the session management network element rejects to establish the first session because the session management network element rejects to establish the first session as an always-on session. Alternatively, the first response message is used to indicate that the session management network element accepts to establish the first session, but does not accept to establish the first session as an always-on session.

Specifically, the session management network element may reject to establish the first session, or may allow establishing the first session, but reject to establish the first session as an always-on session, in other words, establish the first session as a common session. Therefore, the first response message may indicate that the session management network element rejects to establish the first session, or may indicate that the session management network element allows establishing the first session, but does not accept to establish the first session as an always-on session.

In an optional embodiment, that the session management network element determines to reject to establish the first session as an always-on session includes determining, by the session management network element based on any one of the following information, to reject to establish the first session as the always-on session subscription information of the terminal, policy information of the terminal, or local configuration information of the session management network element.

Specifically, the session management network element may perform determining based on the subscription information of the terminal, the policy information of the terminal, or the local configuration information of the session management network element, to determine to reject to establish the first session that is requested by the terminal to establish as the always-on session. Optionally, the subscription information, the policy information, or the local configuration information may carry indication information used to indicate allowing (or rejecting) to establish an always-on session for the terminal. The session management network element may determine, based on the indication information, to reject to establish the first session that is requested by the terminal to establish as the always-on session.

It should be understood that the session management network element may perform determining by using any one of the subscription information, the policy information, or the local configuration information, or may perform comprehensive determining based on any two or three of the three pieces of information. This is not limited in the embodiments of this application.

In a possible implementation, if the session management network element performs determining only based on the subscription information, the session management network element may determine to reject to establish the first session as the always-on session, provided that the subscription information indicates rejecting to establish the always-on session for the terminal. If the session management network element performs determining in combination with the subscription information and the local configuration information, when either of the subscription information and the local configuration information indicates rejecting to establish the always-on session for the terminal, the session management network element may determine to reject to establish the first session as the always-on session. Likewise, if the session management network element performs determining in combination with the subscription information, the policy information, and the local configuration information, when any one of the subscription information, the policy information, and the local configuration information indicates rejecting to establish the always-on session, the session management network element may determine to reject to establish the first session as the always-on session.

In an optional embodiment, that the session management network element determines to reject to establish the first session as an always-on session includes determining, by the session management network element based on any one of the following information, to reject to establish the first session as the always-on session a DNN, S-NSSAI, current location information of the terminal, or an access type of the terminal, where the DNN or the S-NSSAI is carried in the first request message.

Specifically, the session management network element may perform determining based on any one of the DNN, the S-NSSAI, the current location information of the terminal, or the access type of the terminal, to determine to reject to establish the first session that is requested by the terminal to establish as the always-on session. The DNN and the S-NS-SAI are carried in the first request message, and are sent by the terminal to the session management network element. The current location information of the terminal and the access type of the terminal are obtained by the session management network element from the access network element.

In a possible implementation, the session management network element may match the DNN carried in the first request message with at least one DNN that is in the session management network element and that allows establishing an always-on session. If the at least one DNN does not successfully match the DNN carried in the first request message, the session management network element may determine to reject to establish the first session as the always-on session. Optionally, the at least one DNN may be stored in the session management network element in a form of a table, a list, or the like.

In another possible implementation, the session management network element may match the S-NSSAI carried in the first request message with at least one piece of S-NSSAI that is in the session management network element and that allows establishing an always-on session. If the at least one piece of S-NSSAI does not successfully match the S-NSSAI carried in the first request message, the session management network element may determine to reject to establish the first session as the always-on session. Optionally, the at least one piece of S-NSSAI may be stored in the session management network element in a form of a table, a list, or the like.

In another possible implementation, the session management network element may match the obtained current location information of the terminal with at least one piece of location information that is in the session management network element and that allows establishing an always-on session. If the at least one piece of location information does not successfully match the current location information of the terminal, the session management network element may determine to reject to establish the first session as the always-on session. Optionally, the at least one piece of location information may be stored in the session management network element in a form of a table, a list, or the like.

In another possible implementation, the session management network element may match the obtained access type of the terminal with at least one access type that is in the session management network element and that allows establishing an always-on session. If the at least one access type does not successfully match the access type of the terminal, the session management network element may determine to reject to establish the first session as the always-on session. Optionally, the at least one access type may be stored in the session management network element in a form of a table, a list, or the like.

Optionally, the DNN, the S-NSSAI, the current location information of the terminal, or the access type of the terminal may be from the subscription information of the terminal, the policy information of the terminal, or the local configuration information of the session management network element. This is not limited in the embodiments of this application.

It should be understood that the session management network element may perform determining by using any one of the DNN, the S-NSSAI, the current location information of the terminal, or the access type of the terminal, or may perform comprehensive determining based on any quantity of pieces of information in the four pieces of information. This is not limited in the embodiments of this application. In a possible implementation, if the session management network element selects a plurality of pieces of information for determining, if one of the plurality of pieces of information fails to match corresponding information allowing to establish an always-on session, the session management network element determines to reject to establish the first session as the always-on session.

In an optional embodiment, the local configuration information includes any one of the following information a maximum quantity of always-on sessions supported by the terminal or a maximum quantity of always-on sessions supported by the session management network element. That the session management network element determines to reject to establish the first session as an always-on session includes, when a quantity of existing always-on sessions of the terminal is greater than or equal to the maximum quantity of always-on sessions supported by the terminal, determining, by the session management network element, to reject to establish the first session as the always-on session, or when a quantity of existing always-on sessions of the session management network element is greater than or equal to the maximum quantity of always-on sessions supported by the session management network element, determining, by the session management network element, to reject to establish the first session as the always-on session.

Specifically, the local configuration information may include the maximum quantity of always-on sessions supported by the terminal. The session management network element may compare the quantity of existing always-on sessions of the terminal with the maximum quantity of always-on sessions supported by the terminal. If the quantity of existing always-on sessions of the terminal is greater than or equal to the maximum quantity of always-on sessions supported by the terminal, the session management network element may determine to reject to establish the first session as the always-on session.

The local configuration information may include the maximum quantity of always-on sessions supported by the session management network element. The session management network element may compare the quantity of existing always-on sessions of the session management network element with the maximum quantity of always-on sessions supported by the session management network element. If the quantity of existing always-on sessions of the session management network element is greater than or equal to the maximum quantity of always-on sessions supported by the session management network element, the session management network element may determine to reject to establish the first session as the always-on session.

Likewise, if the session management network element determines both the foregoing two conditions, if one of the foregoing two conditions is not met, the session management network element may determine to reject to establish the first session as the always-on session.

Optionally, the local configuration information may include not only the DNN, the S-NSSAI, the current location information of the terminal, or the access type of the terminal, but also the maximum quantity of always-on sessions supported by the terminal or the maximum quantity of always-on sessions supported by the session management network element. In this case, the session management network element may first determine whether a quantity of always-on sessions of the terminal or the session management network element is less than the maximum quantity of always-on sessions supported by the terminal or the session management network element. When the quantity of always-on sessions of the terminal or the session management network element is less than the maximum quantity of always-on sessions supported by the terminal or the session management network element, the session management network element then performs determining in combination with conditions such as the DNN, the S-NSSAI, the current location information of the terminal, or the access type of the terminal. If the quantity of always-on sessions of the terminal or the session management network element is not less than the maximum quantity of always-on sessions supported by the terminal or the session management network element, the session management network element may determine to reject to establish the first session as the always-on session.

In an optional embodiment, after the session management network element sends a first response message to the terminal, the method further includes determining, by the session management network element, to update a session attribute of the first session, where the session attribute is used to indicate that the first session is a non-always-on session, sending, by the session management network element, a notification message to the terminal, where the notification message is used to notify that the session attribute of the first session has been updated to an always-on session, and correspondingly, receiving, by the terminal, the notification message.

Specifically, after the session management network element establishes the first session as a common session, the session management network element may further update the session attribute of the first session, in other words, update the session attribute of the first session from the non-always-on session to the always-on session. Optionally, the session management network element may add, to the first session, an identifier used to identify the first session as an always-on session. The session management network element sends, to the terminal, the notification message used to notify that the session attribute of the first session has been updated to the always-on session. The terminal receives the notification message, to determine that the first session has been updated to the always-on session. Optionally, the terminal may add, to the first session, an identifier used to identify the first session as an always-on session.

According to the session management method in this embodiment of this application, a session attribute of an existing session is updated, so that network resources can be flexibly used. In particular, when the subscription information, the policy information, or the local configuration information changes, the session attribute of the existing session is flexibly adjusted. This helps improve resource utilization of a system, thereby improving system performance.

Figure 5:
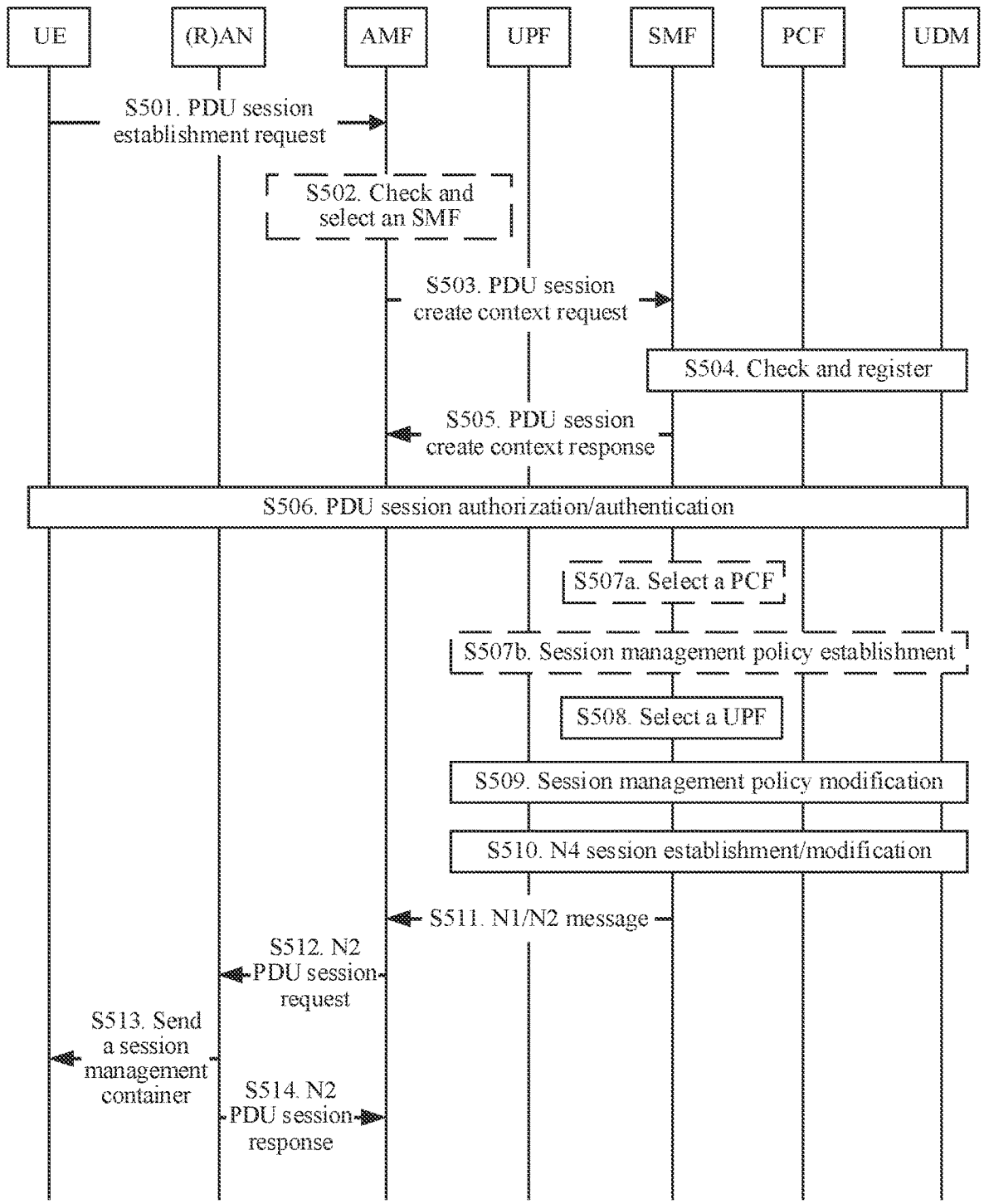
FIG. 5 is a schematic flowchart of another session management method according to an embodiment of this application.
Figure 6:
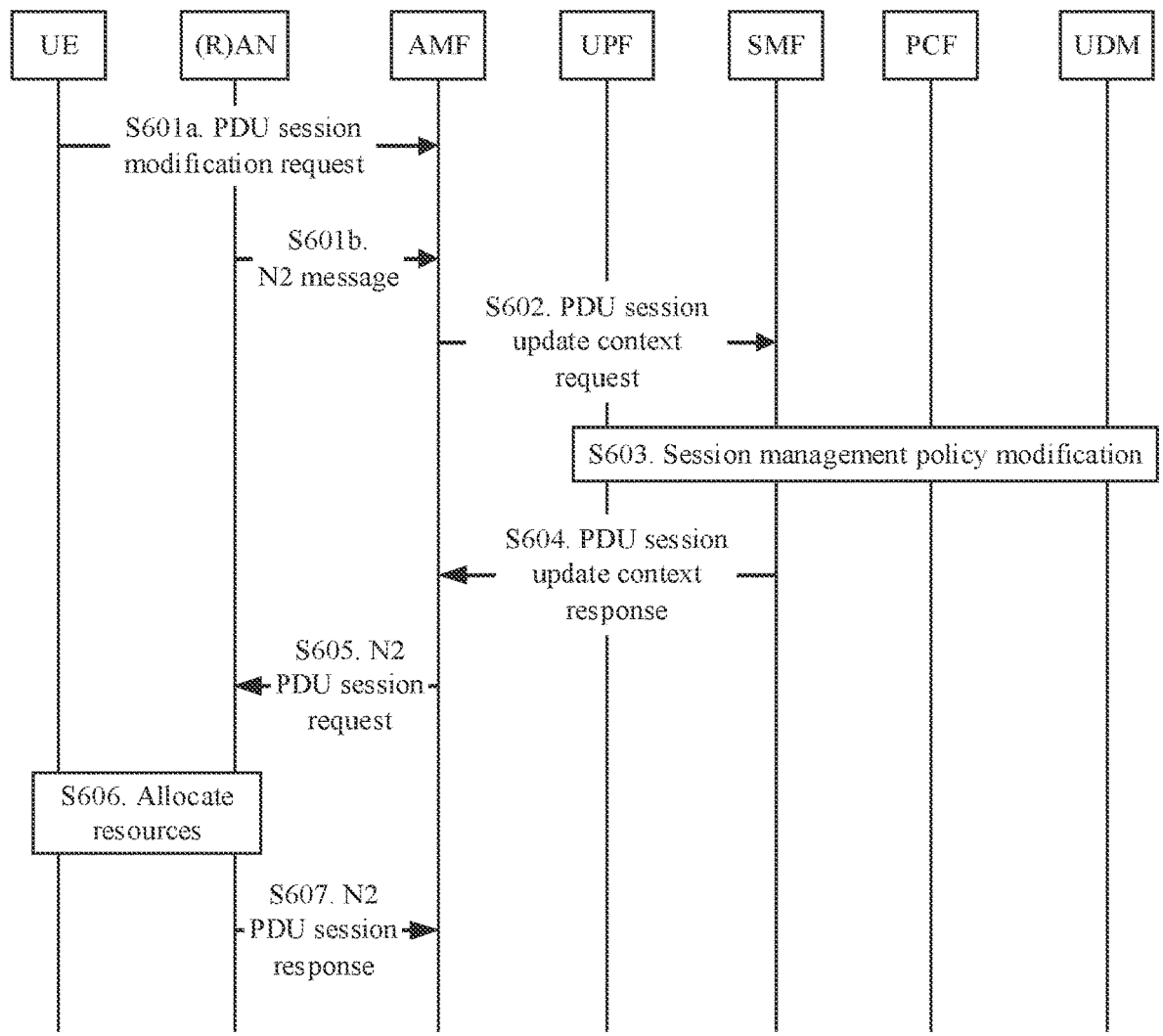
FIG. 6 is a schematic flowchart of another session management method according to an embodiment of this application.
Figure 7:
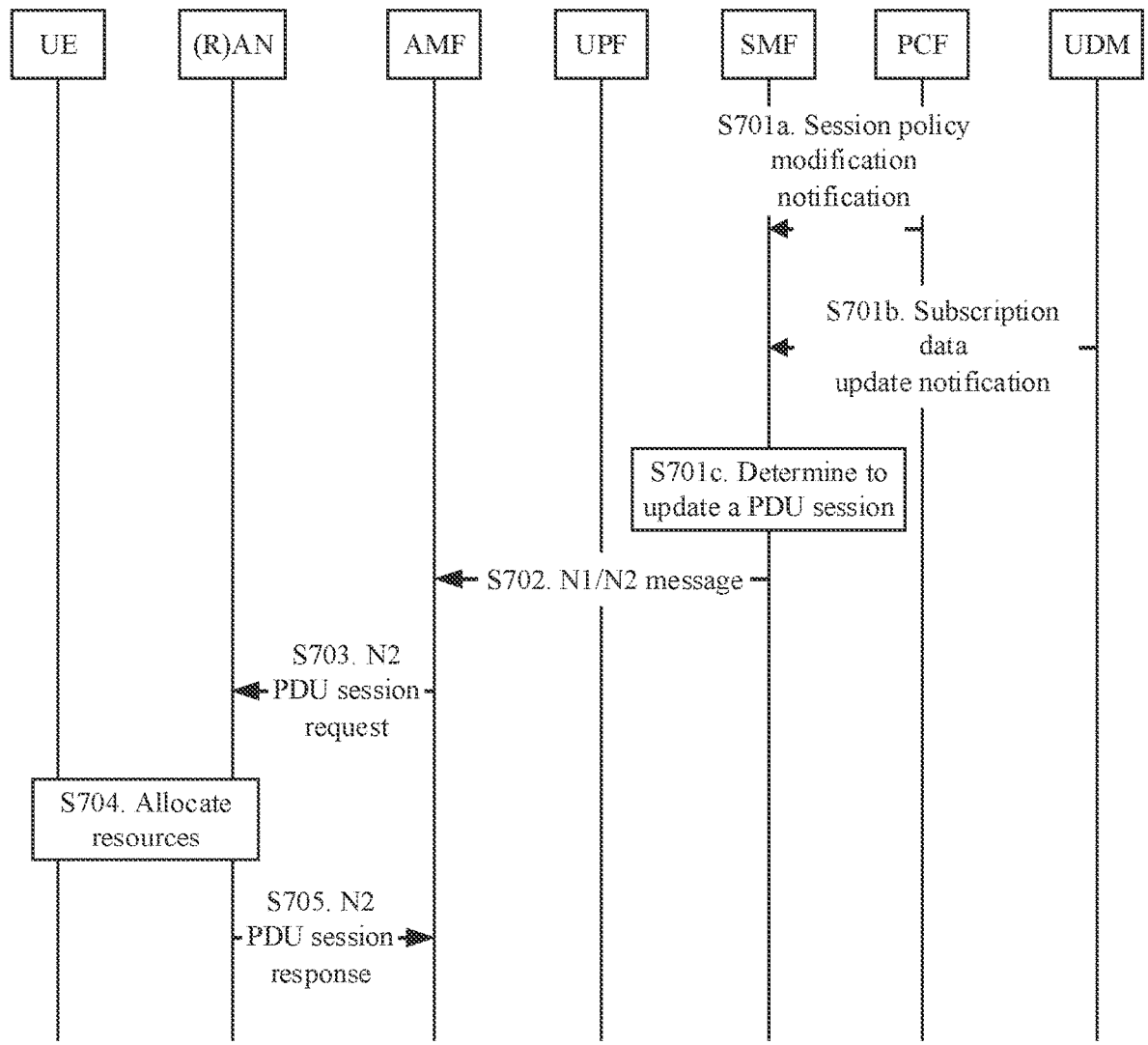
FIG. 7 is a schematic flowchart of another session management method according to an embodiment of this application.

For specific embodiments of the foregoing method, refer to FIG. 5 to FIG. 7 and corresponding descriptions. Details are not described herein.

This application further provides another session management method, including determining, by a mobility management network element, setting information of an always-on session based on any one of the following information subscription information of a terminal, policy information of the terminal, or local configuration information of the mobility management network element, and sending, by the mobility management network element, the setting information of the always-on session to the terminal, and correspondingly, receiving, by the terminal, the setting information of the always-on session from the mobility management network element, and setting, by the terminal, an established first session as an always-on session based on the setting information of the always-on session, where the always-on session is a session for which user-plane resources are activated when the terminal is transitioned from an idle mode to a connected mode.

Specifically, the mobility management network element may determine the setting information of an always-on session of the terminal based on any one of the subscription information of the terminal, the policy information of the terminal, or the local configuration information of the mobility management network element. The setting information of the always-on session is used to indicate information about allowing the terminal to set an always-on session. Then, the mobility management network element sends the setting information of the always-on session to the terminal, and the terminal may set the established first session as the always-on session based on the setting information of the always-on session.

In an embodiment of this application, the terminal does not determine, based on a request provided by an upper layer of the terminal, which sessions may be set as always-on sessions, but determines, based on the setting information of the always-on session sent by the mobility management network element, which sessions may be set as always-on sessions. The setting information of the always-on session may be added by the mobility management network element to a registration procedure or a configuration update procedure and delivered to the terminal. However, this is not limited in the embodiments of this application.

Therefore, according to the session management method in this embodiment of this application, the mobility management network element may notify the terminal of the setting information of the always-on session allowing the terminal to initiate an always-on session. The terminal may determine, based on the setting information of the always-on session, whether to set an existing session as an always-on session. This can further enhance control on an always-on session initiated on a terminal side, thereby effectively avoiding a waste of network resources.

It should be understood that, alternatively, the mobility management network element may comprehensively determine the setting information of the always-on session of the terminal in combination with any two or three of the subscription information of the terminal, the policy information of the terminal, or the local configuration information of the mobility management network element. This is not limited in the embodiments of this application. Specifically, the subscription information, the policy information, or the local configuration information may include S-NSSAI, current location information of the terminal, or an access type of the terminal that allows the terminal to set an always-on session. The mobility management network element may analyze the subscription information, the policy information, or the local configuration information, to obtain DNN information, the S-NSSAI information, a location of the terminal, the access type of the terminal, a service type requested by the terminal, or the like that allows establishing an always-on session, determine the information allowing the terminal to establish an always-on session as the setting information of the always-on session, and send the setting information of the always-on session to the terminal.

In an optional embodiment, that the terminal receives the setting information of the always-on session from the mobility management network element specifically includes sending, by the terminal, a second request message to the mobility management network element, where the second request message is used to request registration with the mobility management network element, and correspondingly, receiving, by the mobility management network element, the second request message from the terminal, where the sending, by the mobility management network element, the setting information of the always-on session to the terminal is specifically sending, by the mobility management network element, a second response message to the terminal, where the second response message is used to indicate that the mobility management network element accepts registration of the terminal, and the second response message carries the setting information of the always-on session, and correspondingly, receiving, by the terminal, the second response message, or sending, by the mobility management network element, a configuration update command to the terminal, where the configuration update command carries the setting information of the always-on session, and correspondingly, receiving, by the terminal, the configuration update command from the mobility management network element, or sending, by the mobility management network element, policy information to the terminal, where the policy information carries the setting information of the always-on session, and correspondingly, receiving, by the terminal, the policy information from the mobility management network element.

Specifically, the setting information of the always-on session may be carried in the second response message of the registration procedure, the configuration update command in the configuration update procedure, or the policy information from a PCF network element by the mobility management network element, and sent to the terminal.

It should be understood that the registration procedure is actively initiated by the terminal, but the configuration update procedure is actively initiated by the mobility management network element, instead of being initiated by the terminal. The configuration update procedure is initiated by the mobility management network element after the terminal implements registration, and is used to deliver the establishment information of the always-on session to the terminal.

In an optional embodiment, the second request message carries capability indication information of the terminal, where the capability indication information is used to indicate a capability of the terminal supporting an always-on session, and the determining, by a mobility management network element, setting information of an always-on session is specifically, when the capability indication information indicates that the terminal supports an always-on session, determining, by the mobility management network element, the setting information of the always-on session based on any one of the following information subscription information of the terminal, policy information of the terminal, or local configuration information of the mobility management network element.

Specifically, the terminal may send, to the mobility management network element in the second request message (which may be referred to as a registration request message) in the initiated registration procedure, the capability indication information indicating that the terminal supports the always-on session. When the terminal supports the always-on session, the mobility management network element may determine the setting information of the always-on session based on the capability indication information, and send the setting information of the always-on session to the terminal. Optionally, the mobility management network element may store the capability indication information.

In an optional embodiment, the setting, by the terminal, an established first session as an always-on session based on the setting information of the always-on session includes setting the established first session as the always-on session when the terminal determines that the established first session meets the setting information of the always-on session.

Specifically, a session that has been established on the terminal may include only the first session, or may include another session in addition to the first session. This is not limited in the embodiments of this application. In other words, the terminal performs determining based on the setting information of the always-on session and in combination with the established session, and may set all established sessions as always-on sessions, or may set only a part of the established sessions as always-on sessions.

It should be understood that a specific method for setting, by the terminal, the first session as an always-on session may be, after receiving the setting information of the always-on session sent by the mobility management network element, the terminal locally sets the established first session as the always-on session based on the setting information of the always-on session, for example, adds an always-on session label (or an always-on session identifier, or the like) to a context of the first session that needs to be set as an always-on session. Optionally, the terminal may further store the setting information of the always-on session.

In an optional embodiment, the setting information of the always-on session is any one of DNN information allowing to establish an always-on session, S-NSSAI information allowing to establish an always-on session, a location of a terminal allowing to establish an always-on session, an access type of the terminal allowing to establish an always-on session, or a service type requested by the terminal allowing to establish an always-on session.

Specifically, a DNN is used as an example. If the terminal has an established first session to a DNN 1, and the establishment information of the always-on session delivered by the mobility management network element includes the DNN 1, the terminal directly locally adds always-on session labels to all established first sessions to the DNN 1. Other information is similar.

For specific embodiments of the foregoing method, refer to FIG. 8A and FIG. 8B to FIG. 10 and corresponding descriptions. Details are not described herein.

For ease of understanding, the following describes the embodiments of this application in detail with reference to FIG. 5 to FIG. 10 by using an example in which a session management network element is an SMF, a mobility management network element is an AMF, and a terminal is UE.

FIG. 5 is a schematic flowchart of a session management method 500 according to an embodiment of this application. The method 500 may be applied to the system architecture 100 shown in FIG. 1, and may be also applied to the application scenario 200 shown in FIG. 2. This is not limited in the embodiments of this application.

In S501, the UE sends a PDU session establishment request to the AMF by using a (R)AN, where the PDU session establishment request is used to request to establish a first session, and correspondingly the AMF receives the PDU session establishment request.

After successfully registering with a network, the UE may determine, based on an upper-layer request, that a new PDU session (that is, the first session) needs to be established to transmit uplink and downlink data. In this case, the UE initiates a PDU session establishment procedure to a network side. Specifically, the UE sends a PDU session establishment request message to the AMF, and the UE encapsulates the PDU session establishment request message into an uplink NAS transport (UL NAS T(R)ANSPORT) message and sends the message to the AMF.

Optionally, if the UE determines, based on the upper-layer request, that the newly established PDU session is an always-on PDU session, the UE may add always-on indication information (corresponding to the second indication information in the foregoing embodiments) to the PDU session establishment request message, to indicate that the PDU session requested to establish is an always-on PDU session. The UE may add the always-on indication information to the uplink NAS transport message.

It should be noted that the always-on indication information added to the PDU session establishment request message and/or the uplink NAS transport message may use a newly defined information element (IE), or may reuse an unused bit in an existing IE (for example, a request type request type IE in the uplink NAS transport message, a PDU session type PDU session type IE in the PDU session establishment request message, or a 5G session management (5GSM) capability IE). A specific form of the always-on indication information is not limited in this application.

Optionally, if the uplink NAS transport message carries the always-on indication information, S502 is performed. If the uplink NAS transport message does not carry the always-on indication information, in other words, the always-on indication information is added to the PDU session establishment request message, the AMF does not perform any processing, and performs S503.

In S502, if the uplink NAS transport message received by the AMF carries the always-on indication information, the AMF performs at least one of the following operations checking whether the AMF supports an always-on PDU session, or checking whether the AMF is capable of selecting an SMF supporting an always-on PDU session.

If all the checked conditions are met, the AMF selects a proper SMF, and continues to perform S503. If one of the checked conditions is not met, the AMF may continue to perform S503, but may not add the always-on indication information to a message sent to the SMF. Alternatively, the AMF may terminate the PDU session establishment procedure, and does not send the entire PDU session establishment request message to the SMF, in other words, the AMF sends the entire PDU session establishment request message, to which a cause value is added, back to the UE by using a downlink NAS transport (DL NAS T(R)ANSPORT) message. If the AMF performs this processing, the following steps are not performed.

In S503, the AMF invokes a PDU session create context request (Nsmf_PDUSession_CreateSMContext Request) service operation provided by the SMF, to request the SMF to create the first session for the UE, and sends, to the SMF in the service operation, the PDU session establishment request message received from the UE. If the check in step S502 succeeds, the service operation further carries the always-on indication information.

Optionally, in this step, the AMF may also invoke a PDU session update context request (Nsmf_PDUSession_UpdateSMContext Request) service operation provided by the SMF. Other specific operations are similar. This is not limited in the embodiments of this application.

It should be understood that if the always-on indication information is added to the PDU session establishment request message, the AMF performs no processing, and encapsulates the PDU session establishment request message into the PDU session create context request and sends the request to the SMF.

In S504, the SMF receives the service operation sent by the AMF, and determines that the service operation carries the PDU session establishment request message. If the service operation carries the always-on indication information, or the PDU session establishment request message carried in the service operation carries the always-on indication information, the SMF performs at least one of the following checks.

(1) Determining, based on subscription information of the UE obtained from UDM, whether to allow establishing the requested first session as an always-on session. Specifically, the SMF determines, based on indication information that is included in the obtained subscription information of the UE and that allows the UE to establish an always-on PDU session, to allow establishing the requested first session as the always-on session.

(2) Determining, based on policy information of the UE obtained from a PCF, whether to allow establishing the requested first session as an always-on session. Specifically, the SMF determines, based on indication information that is included in the obtained policy information of the UE and that allows the UE to establish an always-on PDU session, to allow establishing the requested first session as the always-on session.

(3) Determining, based on local configuration information of the SMF, whether to allow establishing the requested first session as an always-on session. Specifically, the SMF determines, based on indication information that is included in the obtained local configuration information of the SMF and that allows the UE to establish an always-on PDU session, to allow establishing the requested first session to be the always-on session.

Optionally, the local configuration information of the SMF may further include at least one of a maximum quantity of PDU sessions that can be supported by the UE, a maximum quantity of always-on PDU sessions that can be supported by the UE, a maximum quantity of PDU sessions that can be supported by the SMF, and a maximum quantity of always-on PDU sessions that can be supported by the SMF.

In a possible implementation, if a quantity of PDU sessions currently corresponding to the UE does not exceed the maximum quantity of PDU sessions that can be supported by the UE, or a quantity of always-on PDU sessions currently corresponding to the UE does not exceed the maximum quantity of always-on PDU sessions that can be supported by the UE, or if a quantity of PDU sessions currently corresponding to the SMF does not exceed the maximum quantity of PDU sessions that can be supported by the SMF, or a quantity of always-on PDU sessions currently corresponding to the SMF does not exceed the maximum quantity of always-on PDU sessions that can be supported by the SMF, the SMF determines to allow establishing the requested first session as an always-on session.

Optionally, the SMF may further perform comprehensive determining in combination with a DNN, S-NSSAI, current location information of the UE, an access type of the UE, or the like. For example, if the subscription information, the policy information, or the local configuration information includes a DNN and/or S-NSSAI requested by the UE, or if the subscription information, the policy information, or the local configuration information includes the current location information of the UE, or if the subscription information, the policy information, or the local configuration information includes a current access type of the UE, the SMF determines to allow establishing the requested first session to an always-on session.

If a check result is that the SMF allows establishing the requested first session as an always-on session, the SMF continues to perform the PDU session establishment procedure. Optionally, the SMF may mark the first session as an always-on PDU session, or if a check result is that the SMF does not allow establishing the requested first session as an always-on session, the SMF continues to perform the PDU session establishment procedure, but does not mark the first session as an always-on PDU session, or the SMF rejects to establish the first session, and terminates the PDU session establishment procedure.

In S505, the SMF sends a PDU session create context response service operation to the AMF, or sends a PDU session update context response service operation to the AMF.

Optionally, secondary authorization/authentication of the PDU session is performed in S506. It should be understood that, if a request type of the first session indicates that the first session is an "existing PDU session", an "emergency request", or an "existing emergency PDU session", the SMF does not perform the secondary authorization/authentication.

In S507a, if a dynamic policy and charging control (PCC) is deployed, the SMF selects a PCF. If the request type indicates the "existing PDU session" or the "existing emergency PDU session", the SMF should use a PCF that has been selected for the PDU session. If no PCC is deployed, the SMF may apply a local policy.

In S507b, the SMF may perform a session management policy establishment procedure. The procedure is used to establish a PDU session with a PCF, and obtain a default PCC rule of the PDU session.

It should be noted that, S507a and S507b are alternative steps. In other words, either S507a is performed, or S507b is performed, and S507a and S507b are not both performed.

In S508, if the request type indicates an "initial request", the SMF needs to select a session and service continuity (SSC) mode for the PDU session, and also selects one or more UPFs as required.

In S509, the SMF may perform a session management policy modification procedure. The procedure is used to notify the PCF of some events to which the SMF subscribes.

In S510, if the request type indicates the "initial request", the SMF initiates an N4 session establishment procedure to a selected UPF, or if the request type does not indicate the "initial request", the SMF initiates an N4 session modification procedure to the selected UPF.

In S511, the SMF invokes an N1/N2 message transfer (Namf_Communication_N1N2MessageT(R)ANsfer) service operation provided by the AMF, and sends, to the AMF, an N1 SM container that needs to be sent to the UE and N2 SM information that needs to be sent to the (R)AN.

Specifically, that the N1 SM container includes a response message of the SMF for the PDU session establishment request message may specifically include (1) if the SMF allows establishing the requested first session as an always-on session in S504, the N1 SM container includes a PDU session establishment accept message, and adds always-on indication information to the PDU session establishment accept message, to indicate that the SMF accepts the request for establishing the first session, and establishes the first session as an always-on PDU session, or (2) if the SMF does not allow establishing the requested first session as an always-on session in S504, and therefore rejects to establish the first session, the N1 SM container includes a PDU session establishment reject message, and adds a cause value to the PDU session establishment reject message, where the cause value is used to indicate that the SMF rejects to establish the first session because the SMF rejects to establish the first session as an always-on PDU session, or (3) if the SMF does not allow establishing the requested first session as an always-on session in S504, but still allows establishing the first session, the N1 SM container includes a PDU session establishment accept message, and does not add always-on indication information to the message.

Information included in the N2 SM information is specifically (1) if the SMF allows establishing the requested first session as an always-on session in S504, the N2 SM information includes always-on indication information used to indicate that the currently established first session is an always-on PDU session, or (2) if the SMF does not allow establishing the requested first session as an always-on session in S504, the N2 SM information does not include always-on indication information.

In S512, the AMF sends an N2 PDU session request message to the (R)AN. The message is also referred to as a PDU session resource setup message. The message includes the N2 SM information that is received in the S511 and that needs to be sent to the (R)AN and the N1 SM container that needs to be sent to the UE. If the N2 SM information in S511 includes the always-on indication information, the (R)AN marks the first session as an always-on PDU session.

In S513, the (R)AN sends the received N1 SM container to the UE. Specifically, the (R)AN may add the received N1 SM container to a radio resource control (RRC) connection reconfiguration message and send the message to the UE. If the PDU session establishment accept message included in the N1 SM container in the S511 carries the always-on indication information, the UE marks the PDU session as an always-on PDU session. If the N1 SM container includes the PDU session establishment reject message, the UE learns, based on the carried reject cause value, that the PDU session fails to be established because the network side rejects to establish an always-on PDU session.

In S514, the (R)AN sends an N2 PDU session response message to the AMF. The N2 PDU session response message includes access network tunnel information, a list of accepted or rejected QoS flow identifiers (QFI), and the like.

Optionally, after the foregoing steps, the PDU session establishment procedure may further include the following steps.

The AMF invokes the PDU session update context request service operation provided by the SMF, where the PDU session update context request service operation includes the N2 SM information and the like. The AMF forwards the received N2 SM information to the SMF.

The N4 session modification procedure is performed between the SMF and the UPF, and the SMF provides the access network tunnel information and a corresponding forwarding rule for the UPF.

The SMF invokes the PDU session update context response service operation provided by the SMF, so that the SMF may subscribe to a UE motion event and the like from the AMF in this step.

After S505, if the SMF discovers that the PDU session fails to be established, the SMF may notify the AMF by using a PDU session context status notification service operation at any time. In addition, the SMF releases an established N4 session and information associated with the PCF.

In a scenario of IP version 6 (IPv6), or IP version 4 and version 6 (IPv4v6), the SMF generates an IPv6 route advertisement, and sends the IPv6 route advertisement to the UPF and the UE.

If the PDU session fails to be established after S504, the SMF performs an unsubscription procedure of session management subscription data modification, and initiates deregistration of a given PDU session to the UDM.

After the PDU session establishment procedure is complete and the UE returns to an idle mode, the UE stores the always-on PDU session. Subsequently, when the UE is switched from an idle mode to a connected mode because uplink signaling or uplink data needs to be sent, for the always-on PDU session, the UE always requests the network side to establish corresponding air interface user plane resources, also referred to as DRB resources. Specifically, the UE may instruct, by setting a bit (for example, setting to 1) corresponding to the always-on PDU session in an uplink data status IE in a sent uplink NAS message, the network side to establish corresponding DRB resources. The uplink NAS message may include a registration request message or an SR message. However, this is not limited in the embodiments of this application.

According to the session management method in this embodiment of this application, the SMF receives the session establishment request of the UE, and determines, based on an actual situation, to establish the always-on session for the UE. This can flexibly manage a procedure of establishing the always-on session by the network side, and helps avoid unnecessary consumption of network resources, thereby improving system performance.

In addition, when the UE intends to establish the always-on PDU session, the network side may determine, based on the subscription information, the policy information, the local configuration information, or the like, whether to allow establishing the always-on PDU session for the UE. This effectively reduces unnecessary resource consumption. In addition, according to the method in this embodiment of this application, a consistent understanding of an always-on feature of the PDU session is maintained between the UE and the network side.

FIG. 6 is a schematic flowchart of another session management method 600 according to an embodiment of this application. The method 600 may be applied to the system architecture 100 shown in FIG. 1, and may be also applied to the application scenario 200 shown in FIG. 2. This is not limited in the embodiments of this application.

In S601a, after the UE has established a PDU session, the UE may initiate a PDU session modification procedure to a network side.

Specifically, the UE sends a PDU session modification request message to the AMF. The PDU session modification request message carries indication information, to indicate that an always-on feature of a PDU session requested by the SMF needs to be modified (for ease of description, the indication information is referred to as "always-on update indication information" for short). The UE encapsulates the PDU session establishment request message into an uplink NAS transport (UL NAS TRANSPORT) message and send the message to the AMF. Optionally, the UE may add the always-on update indication information to the uplink NAS transport message.

It should be noted that, the always-on update indication information carried in the PDU session establishment request message and/or the uplink NAS transport message may be a newly defined IE, or may reuse an unused bit in an existing IE (for example, a request type IE in the uplink NAS transport message, or a 5GSM capability IE in the PDU session modification request message). A specific form of the always-on update indication information is not limited in the embodiments of this application.

In S601b, when an access network resource mapped to a QoS flow is released, a (R)AN sends an N2 message to the AMF. The N2 message carries the always-on update indication information, to indicate that the (R)AN intends to modify an always-on feature of the PDU session.

It should be noted that, S601a and S601b are alternative steps. In other words, either S601a is performed, or S601b is performed, and S601a and S601b are not both performed at the same time.

In S602, after receiving the uplink NAS transport message or the N2 message, the AMF invokes a PDU session update context request (Nsmf_PDUSession_UpdateSM-Context Request) service operation provided by the SMF, to request the SMF to modify the PDU session for the UE, and sends, to the SMF in the service operation, the PDU session modification request message received from the UE. If the NAS transport message carries the always-on update indication information, the service operation still carries the indication information.

In S603, the SMF may report a subscribed event to the PCF by using a session management policy modification procedure.

In S604, the SMF invokes a PDU session update context (Nsmf_PDUSession_UpdateSMContext) service operation. An N1 SM container in the service operation includes the always-on update indication information. Optionally, N2 SM information in the Nsmf_PDUSession_UpdateSMContext message may include the always-on update indication information.

In S605, the AMF sends an N2 PDU session request to the (R)AN. If the N2 SM information includes the always-on indication information, the (R)AN updates the always-on feature of the PDU session.

In S606, the UE interacts with the (R)AN, and the (R)AN allocates resources to the PDU session. After receiving the always-on update indication information, the UE updates the always-on feature of the PDU session.

In S607, the (R)AN sends an N2 PDU session response message to respond to the N2 PDU session request from the AMF, where the N2 PDU session response message includes access network tunnel information and the like.

Optionally, after the foregoing steps, the PDU session update procedure may further include the following steps.

The AMF forwards, to the SMF by invoking the PDU session update context request service operation, the received N2 SM information and location information received from an access network. The SMF returns a PDU session update context response to the AMF.

The UE determines a PDU session modification command by using a NAS message.

The (R)AN directly forwards the NAS message to the AMF.

The AMF forwards, to the SMF by invoking the PDU session update context request service operation, the received N1 SM container and the user location information received from the access network. The SMF returns a PDU session update context response to the AMF.

An N4 session update procedure may be performed between the SMF and a UPF.

It should be understood that updating the always-on feature of the PDU session may include updating a non-always-on session to an always-on session, or may include updating an always-on session to a non-always-on session.

According to the session management method in this embodiment of this application, a session attribute of an existing session is updated, so that network resources can be flexibly used. In particular, when subscription information, policy information, or local configuration information changes, the session attribute of the existing session is flexibly adjusted. This helps improve resource utilization of a system, thereby improving system performance.

FIG. 7 is a schematic flowchart of another session management method 700 according to an embodiment of this application. The method 700 may be applied to the system architecture 100 shown in FIG. 1, and may be also applied to the application scenario 200 shown in FIG. 2. This is not limited in the embodiments of this application.

In S701a, a PCF performs a session management policy modification procedure based on a current policy or a request from an application network element. Specifically, the PCF invokes a session policy modification notification (Npcf_SMPolicyControl_UpdateNotify) service operation to notify the SMF of modifying the PDU session for the UE. The service operation may carry always-on update indication information.

In S701b, a UDM invokes a subscription data update notification (Nudm_SDM_Notification) service operation to notify the SMF of modifying the PDU session for the UE. The service operation may carry always-on update indication information. After receiving the notification, the SMF updates session management subscription data, and returns acknowledgment information to the UDM.

In S701c, the SMF may determine, based on a local configuration, to modify an always-on feature of a PDU session, and the SMF starts to perform a PDU session update procedure.

It should be noted that only one of S701a, S701b, and S701c can be selected at a time. In other words, one of S701a, S701b, or S701c is performed at a time, and S701a, S701b, and S701c are not all performed at the same time.

In S702, the SMF invokes an N1/N2 message transfer (Namf_Communication_N1N2MessageTransfer) service operation provided by the AMF, where an N1 SM container in the service operation includes the always-on update indication information. Optionally, N2 SM information in the Namf_Communication_N1N2MessageTransfer service operation may include the always-on update indication information.

In S703, the AMF sends an N2 PDU session request to a (R)AN. If the N2 SM information includes the always-on indication information, the (R)AN updates the always-on feature of the PDU session.

In S704, the UE interacts with the (R)AN, and the (R)AN allocates resources to the PDU session. After receiving the always-on update indication information, the UE updates the always-on feature of the PDU session.

In S705, the (R)AN sends an N2 PDU session response message to respond to the N2 PDU session request from the AMF, where the N2 PDU session response message includes access network tunnel information and the like.

Optionally, after the foregoing steps, the PDU session update procedure may further include the following steps. The AMF forwards, to the SMF by invoking a PDU session update context request service operation, the received N2 SM information and location information received from an access network. The SMF returns a PDU session update context response to the AMF.

The UE determines a PDU session modification command by using a NAS message.

The (R)AN directly forwards the NAS message to the AMF.

The AMF forwards, to the SMF by invoking the PDU session update context request service operation, the received N1 SM container and user location information received from the access network. The SMF returns a PDU session update context response to the AMF.

An N4 session update procedure may be performed between the SMF and a UPF.

It should be understood that updating the always-on feature of the PDU session may include updating a non-always-on session to an always-on session, or may include updating an always-on session to a non-always-on session.

According to the session management method in this embodiment of this application, a session attribute of an existing session is updated, so that network resources can be flexibly used. In particular, when subscription information, policy information, or local configuration information changes, the session attribute of the existing session is flexibly adjusted. This helps improve resource utilization of a system, thereby improving system performance.

Figure 8A:
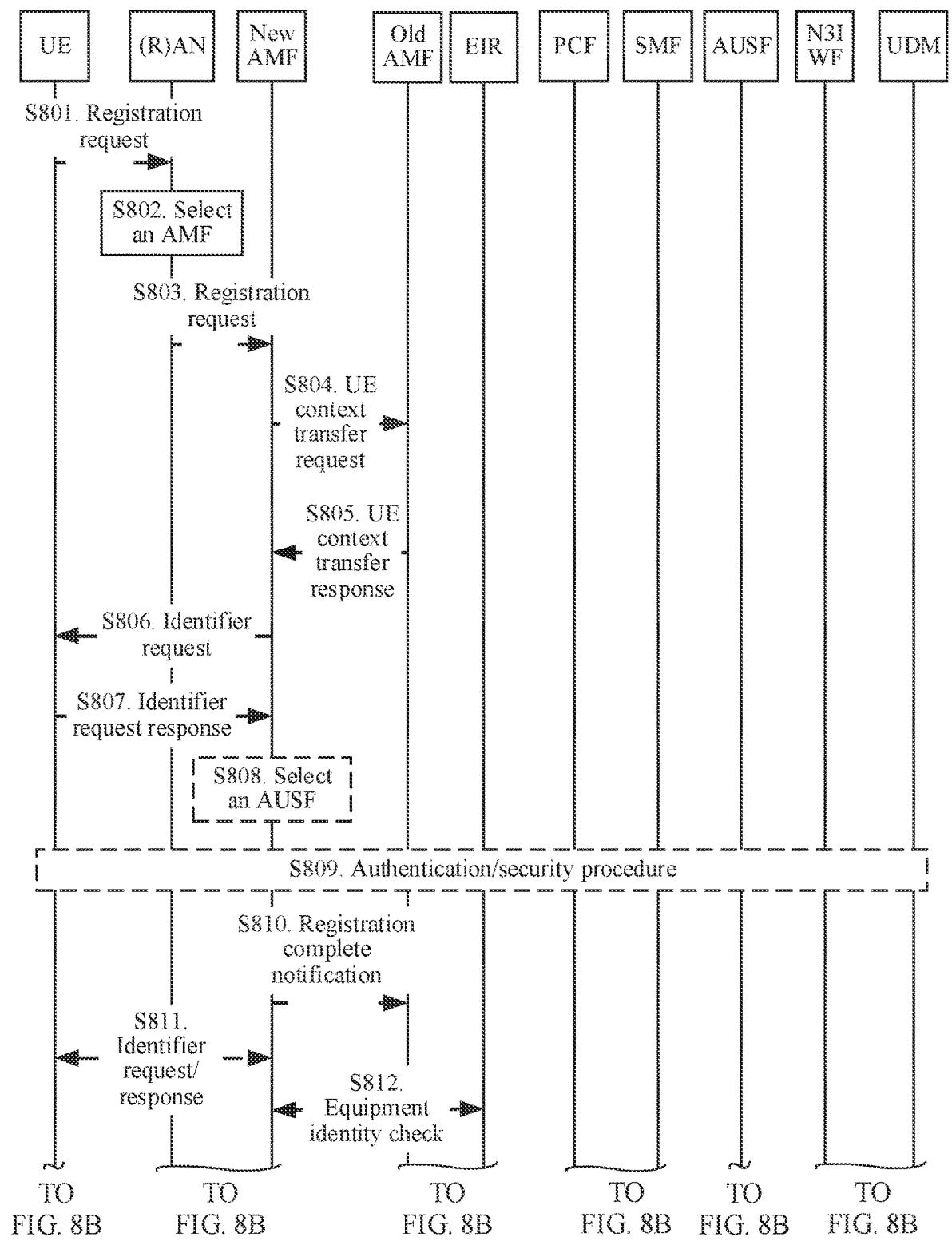
FIG. 8A and FIG. 8B are a schematic flowchart of another session management method according to an embodiment of this application.
Figure 8B:
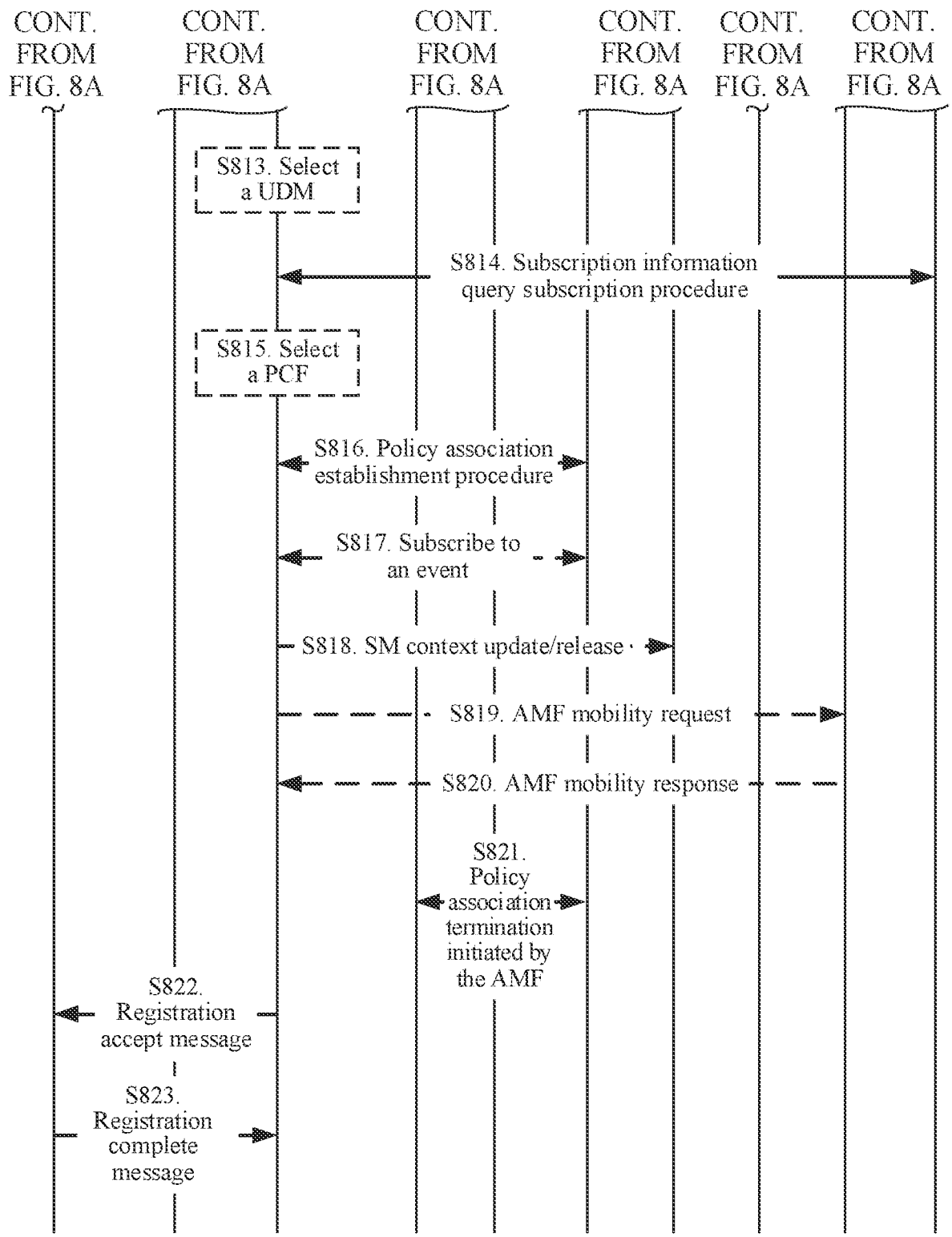

FIG. 8A and FIG. 8B are a schematic flowchart of another session management method 800 according to an embodiment of this application. The method 800 may be applied to the system architecture 100 shown in FIG. 1, and may be also applied to the application scenario 200 shown in FIG. 2. This is not limited in the embodiments of this application.

In S801, the UE sends a registration request message to a (R)AN.

Specifically, registration types requested by the registration request message may include (1) initial registration, in other words, the UE is in an rm-deregistered state, (2) mobility registration update, in other words, the UE is in an rm-registered state, and registration is initiated due to movement, and (3) periodic registration update, in other words, the UE is in the rm-registered state, and registration is initiated because a periodic registration update timer expires. The registration request message may be included in an access network message and forwarded to the (R)AN.

In S802, if the UE has not been registered or registered information provided by the UE is invalid, the (R)AN selects an appropriate AMF. Optionally, if the (R)AN is not capable of selecting an appropriate AMF, the (R)AN may forward the registration request message to a configured default AMF.

In S803, the (R)AN forwards the registration request message to the AMF by using an N2 message.

If the registration type requested by the registration request message is the periodic registration update, S804 to S817 are skipped, and S818 is performed. If the registration type requested by the registration request message is not the periodic registration update, S804 is performed.

In S804, if the AMF changes, a new AMF sends a UE context transfer (Namf_Communication_UEContextTransfer) request to the old AMF. To be specific, the new AMF invokes an Namf_Communication_UEContextTransfer service operation on the old AMF, to request a subscription permanent identifier (SUPI) and a mobility management (MM) context of the UE.

In S805, the old AMF sends a UE context transfer (Namf_Communication_UEContextTransfer) response to the new AMF, where the response includes the SUPI and the MM context.

Optionally, if information about an established PDU session exists on the old AMF, the UE context transfer response sent by the old AMF to the new AMF may include information about an SMF, and may specifically include S-NSSAI, an SMF identifier, a PDU session identifier (ID), and the like. If there is active next generation application protocol (NGAP) UE-transport network layer association (TNLA) binding to non-3GPP interworking function (N3IWF) information on the old AMF, the UE context transfer response sent by the old AMF to the new AMF may include the NGAP UE-TNLA binding.

In S806, if the UE does not provide the SUPI and the old AMF does not find a subscription concealed identifier (SUCI), the new AMF sends an identifier request to the UE, to request the SUCI.

In S807, the UE sends an identifier request response to the new AMF, where the identifier request response carries the SUCI. The SUCI may be an SUCI derived by the UE based on a public key allocated by a home public land mobile network (HPLMN).

Optionally, in S808, the AMF may determine to initiate authentication of the UE by invoking an AUSF. In this case, the AUSF needs to be selected based on the SUCI or the SUPI. If support of unauthenticated SUPI for emergency registration for the AMF, the AMF may skip authentication and security creation, or after the AMF receives an authentication failure, the AMF continues to perform a subsequent registration procedure.

In S809, an authentication/security procedure of the UE is performed by using the AUSF, the AMF initializes a NAS security function, and the RAN stores a security context and confirms the security context to the AMF.

In S810, the new AMF sends a registration complete notification (Namf_Communication_RegistrationCompleteNotify) to the old AMF.

Specifically, if the AMF changes, in other words, changes from the old AMF to the new AMF, the new AMF invokes an Namf_Communication_RegistrationCompleteNotify service operation after registration of the UE is completed. If the authentication/security procedure fails, a registration request of the UE should be rejected, and the new AMF invokes the Namf_Communication_RegistrationCompleteNotify service operation, and marks a rejection cause with a failure code. The old AMF continues to work, and this is the same as a service operation performed when no UE context transfer request is received.

In S811, if a permanent equipment identifier (PEI) is not provided by the UE and is not found on the old AMF, the new AMF initiates an identifier request message to the UE to query for the PEI, and the UE returns the PEI by using an identifier request response.

It should be understood that, except for an emergency registration scenario in which authentication cannot be performed, the PEI should be encrypted for transmission. In the emergency registration scenario, a PEI may have been provided in a registration request, and in this case, no request needs to be made.

Optionally, in S812, the new AMF invokes an equipment identity check (N5g-eir_EquipmentIdentityCheck_Get) service operation to initiate a mobile equipment identity check. In the emergency registration scenario, if a PEI is unavailable, whether an emergency registration procedure continues or stops is determined according to an operator policy.

In S813, the new AMF selects a UDM based on the SUPI, and then the UDM selects a unified data repository (UDR) instance.

In S814, if the AMF changes, or the UE provides an SUPI whose valid context cannot be found in the AMF, or the UE registers with an AMF who has been registered with the UE accessing by using non-3GPP, the new AMF registers with the UDM, and performs a subscription information query subscription procedure.

Specifically, the UDM stores an AMF identifier related to an access type, and does not remove an AMF identifier related to another access type. The UDM may store information about registration in the UDR by using Nudr_UDM_Update. The AMF queries, by using Nudm_SDM_Get, access and mobility subscription data and SMF selection subscription data. The AMF subscribes to a modification of request data from the UDM by using Nudm_SDM_Subscribe, and the UDM subscribes to a change of data from the UDR by using Nudr_UDM_Subscribe. After obtaining the mobility subscription data from the UDM, the new AMF creates an MM context for the UE. In the emergency registration scenario, if the UE cannot be authenticated successfully, the AMF should not register the UE with the UDM. In the emergency registration scenario, the AMF does not check an access restriction, an area restriction, or a subscription restriction, and ignores a registration failure response from the UDM to continue the registration procedure. When the UDM stores a relationship between an access type and a serving AMF, the UDM starts to invoke an Nudm_UECM_DeregistrationNotification (deregistration notification) of the old AMF corresponding to a 3GPP. In addition, the old AMF removes the MM context of the UE. If a removal cause of the service network function (NF) marked in the UDM is initial registration, the old AMF invokes an Namf_EventExposure_Notify (event notification request) service operation to notify all SMFs related to the UE that the UE is deregistered from the old AMF. After receiving the notification, the SMF releases all PDU sessions related to the UE.

In S815, if the AMF does not obtain an access or mobility policy from the UE or an access and mobility policy in the AMF is no longer valid, the AMF selects a PCF to start PCF communication.

It should be understood that, if the new AMF obtains a PCF ID from the old AMF, and successfully communicates with the PCF by using the PCF ID, the new AMF selects a visited (V–) PCF based on the PCF ID. If the PCF ID cannot be used or the new AMF does not obtain the PCF ID, the new AMF needs to reselect a PCF.

Optionally, in S816, the new AMF establishes a policy association during the registration procedure. In the emergency registration scenario, this step may be skipped.

If the new AMF has communicated with the PCF, the AMF should add the PCF ID to an Npcf_AMPolicyControl obtaining operation. In an initial registration procedure, the AMF does not provide the identifier.

If the AMF notifies the PCF that a mobility restriction (such as a location of the UE) is to be adjusted, or if the PCF updates the mobility restriction due to some conditions (such as an application in use), the PCF should provide the AMF with an updated mobility restriction.

In S817, the PCF may invoke Namf_EventExposure_Subscribe to subscribe to an event of the UE.

In S818, for UE in emergency registration, when a registration type is a mobile registration update, the new AMF sends SM context update (Nsmf_PDUSession_UpdateSMContex) or SM context release (Nsmf_PDUSession_ReleaseSMContext) to the SMF.

Specifically, if a to-be-deactivated PDU session is provided in S801, the new AMF sends an Nsmf_PDUSession_UpdateSMContext request to an SMF associated with the PDU session, to activate a user plane connection of the PDU session. If a status of the PDU session indicates that the PDU session has been released on the UE, the new AMF invokes an Nsmf_PDUSession_ReleaseSMContext service operation from the SMF, to release all network resources associated with the PDU session.

It should be understood that, if the serving AMF changes, the new AMF should wait until S817 is performed, and then performs S818, or if the serving AMF does not change, S817 may be performed concurrently with S818 to S822. After this step is performed, a mobility related notification of a network element consumer is triggered.

In S819, if the AMF changes, the new AMF sends an N2 AMF mobility request to an N3IWF, to create an NGAP UE relationship with the N3IWF connected to the UE.

In S820, the N3IWF sends an N2 AMF mobility response to the new AMF.

Optionally, in S821, the old AMF sends a policy association termination to the (V−) PCF. If the old AMF has previously initiated a policy association to the PCF, this step is performed.

In S822, the new AMF sends a registration accept message to the UE, where the registration accept message includes related information that the network allows the UE to initiate an always-on session, and the related information may include a DNN, S-NSSAI, a current location of the UE, a current access type or a current service type of the UE, or the like. For example, the AMF allows the UE to set only an existing session whose service type is an emergency service as an always-on session, or the AMF allows setting only an existing session that requests a service from a specific DNN or some DNNs as an always-on session.

In S823, the UE sends a registration complete message to the new AMF, to acknowledge whether a new 5G-global unique temporary identifier (GUTI) is allocated. After receiving the related information about an always-on session that is sent by the AMF, the UE subsequently sets, based on the related information, a session meeting a condition as an always-on session. Optionally, the UE may store the related information.

According to the session management method in this embodiment of this application, the AMF may notify, by using the registration procedure, the UE of the related information allowing the UE to initiate an always-on PDU session. The UE may determine, based on the related information, whether to set an established session as an always-on session. Therefore, in this embodiment of this application, control can be further enhanced on always-on session setting on a UE side. This effectively prevents a waste of network resources.

Figure 9:
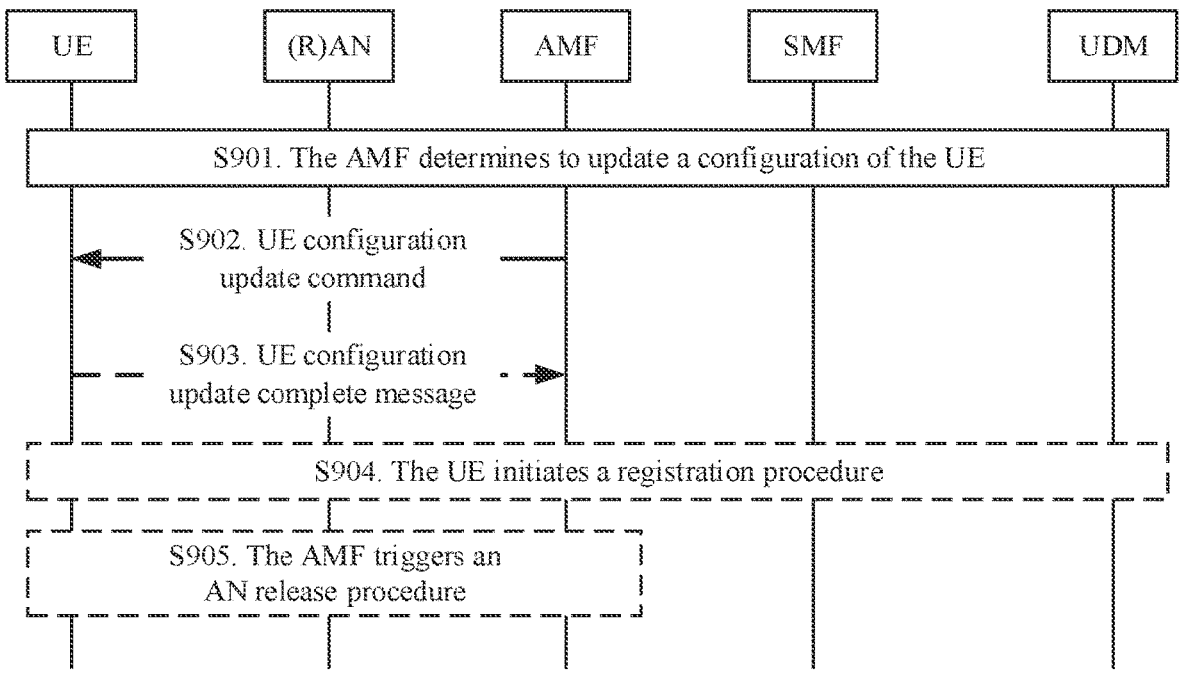
FIG. 9 is a schematic flowchart of another session management method according to an embodiment of this application.

FIG. 9 is a schematic flowchart of a session management method 900 according to an embodiment of this application. The method 900 may be applied to the system architecture 100 shown in FIG. 1, and may be also applied to the application scenario 200 shown in FIG. 2. This is not limited in the embodiments of this application.

In S901, the AMF determines, based on a plurality of causes, to update a configuration of the UE. The plurality of causes may include a mobility change of the UE, a network side policy, a subscription data update notification received from a UDM, a network slice configuration change, or the like. This is not limited in the embodiments of this application.

In S902, the AMF sends a UE configuration update command to the UE.

Specifically, the UE configuration update command may include one or more parameters of the UE, for example, a 5G-GUTI, a tracking area identity list (TAI List), allowed slice information (Allowed NSSAI), mapping of allowed slice information (Mapping Of Allowed NSSAI) of the UE, and related information about an always-on session that is initiated by the UE and that is allowed by a network to establish. In addition, the related information about an always-on session that is initiated by the UE and that is allowed by a network to establish may include a DNN, S-NSSAI, a current location of the UE, a current access type or a current service type of the UE, or the like. For example, the AMF allows the UE to set only an existing session whose service type is an emergency service as an always-on session, or the AMF allows setting only an existing session that requests a service from a specific DNN or some DNNs as an always-on session.

In S903, if the UE configuration update command needs to be acknowledged, the UE sends a UE configuration update complete message to the AMF.

After receiving the related information about an always-on session that is sent by the AMF, the UE subsequently sets, based on the related information, a session meeting a condition as an always-on session. Optionally, the UE may store the related information.

In S904, if the UE configuration update command message includes a mobile initiated connection only (MICO) mode, the UE initiates a registration procedure to acknowledge renegotiation of the MICO mode.

The UE may initiate the registration procedure when being in a connected mode, or may initiate the registration procedure after entering an idle mode. This is not limited in the embodiments of this application.

In S905, if new slice information or newly configured slice information in the UE configuration update command does not affect a slice of an existing connection, the AMF does not trigger an access network release procedure. If the new slice information or the new configured slice information in the UE configuration update command affects a slice of an existing connection, the AMF triggers the access network release procedure.

According to the session management method in this embodiment of this application, the AMF may notify, by using a UE configuration update procedure, the UE of the related information allowing the UE to initiate an always-on PDU session. The UE may determine, based on the related information, whether to set an established session as an always-on session. Therefore, in this embodiment of this application, control can be further enhanced on always-on session setting on a UE side. This effectively prevents a waste of network resources.

Figure 10:
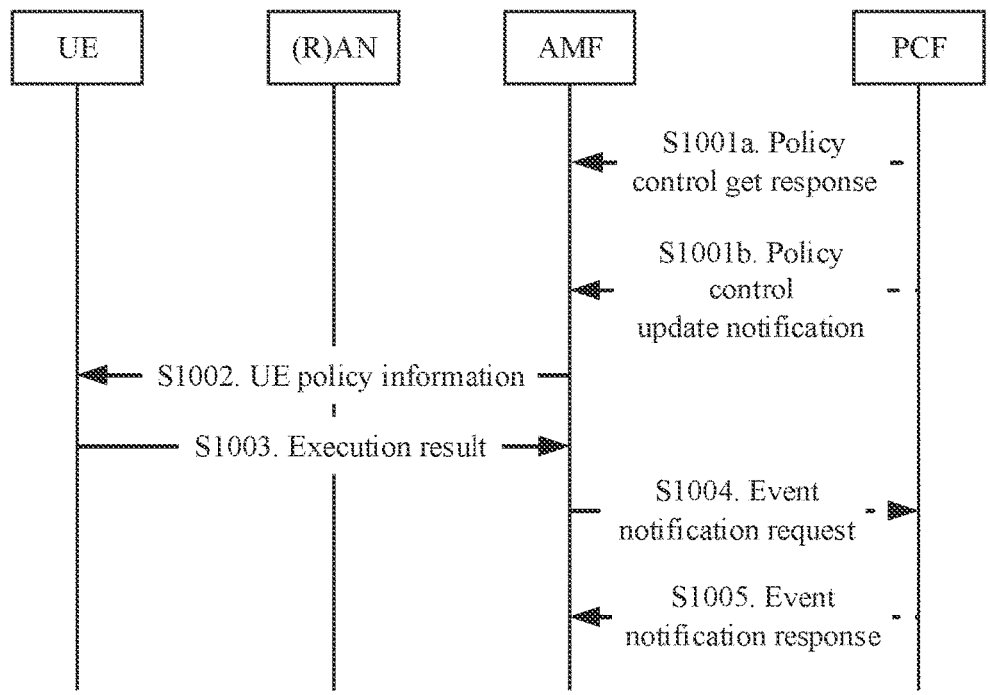
FIG. 10 is a schematic flowchart of another session management method according to an embodiment of this application.

FIG. 10 is a schematic flowchart of a session management method 1000 according to an embodiment of this application. The method 1000 may be applied to the system architecture 100 shown in FIG. 1, and may be also applied to the application scenario 200 shown in FIG. 2. This is not limited in the embodiments of this application.

In S1001a, the AMF receives a policy control get response (Npcf_AMPolicyControlGet Response) from a PCF, where the policy control get response includes information related to access movement and/or a UE policy container (such as information related to UE access and PDU session selection).

In S1001b, the AMF receives a policy control update notification (Npcf_AMPolicyControl UpdateNotify) from a PCF, where the policy control update notification includes information related to access mobility and/or a UE policy container (information related to UE access and PDU session selection).

It should be noted that, S10l a and S1001b are alternative steps. In other words, either S1001a is performed, or S1001b is performed, and S1001a and S1001b are not both performed at the same time.

Specifically, the UE policy container includes policy information that needs to be added, modified, or deleted. The modified policy includes related information that a network allows the UE to initiate an always-on session, where the related information may include a DNN, S-NSSAI, a current location of the UE, a current access type or a current service type of the UE, or the like. For example, the AMF allows the UE to set only an existing session whose service type is an emergency service as an always-on session, or the AMF allows setting only an existing session that requests a service from a specific DNN or some DNNs as an always-on session.

In S1002, if the UE is in a connected mode, the AMF transparently transmits, to the UE, UE policy information received from the PCF. If the UE is in an idle mode, the AMF triggers an SR initiated by the network. If the UE is unreachable, the UE notifies the PCF of the information.

In S1003, the UE executes the received policy indication information, and sends an execution result to the AMF.

Specifically, after receiving the related information about an always-on session that is sent by the AMF, the UE subsequently sets, based on the related information, a session meeting a condition as an always-on session. Optionally, the UE may store the related information.

Optionally, in S1004, if the PCF subscribes, from the AMF, to information about policy information receiving, after receiving the execution result from the UE, the AMF sends an event notification (Namf_EventExposureNotify) request to the PCF, to notify the PCF that the policy container has been received.

In S1005, the PCF sends an event notification response to the AMF, to acknowledge that the notification has been received.

According to the session management method in this embodiment of this application, the AMF may notify, by using a UE configuration update procedure, the UE of the related information allowing the UE to initiate an always-on PDU session. The UE may determine, based on the related information, whether to set an established session as an always-on session. Therefore, in this embodiment of this application, control can be further enhanced on always-on session setting on a UE side. This effectively prevents a waste of network resources.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

The foregoing describes in detail the session management method according to the embodiments of this application with reference to FIG. 1 to FIG. 10. The following describes in detail apparatuses according to the embodiments of this application with reference to FIG. 11 to FIG. 13.

Figure 11:
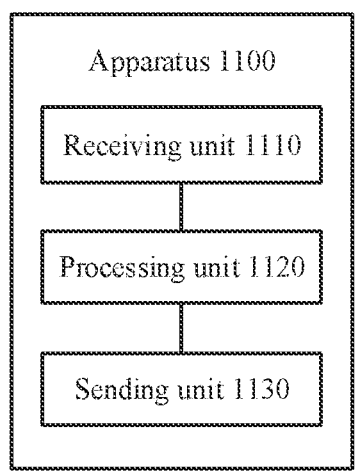
FIG. 11 is a schematic block diagram of an apparatus according to an embodiment of this application.

FIG. 11 shows an apparatus 1100 according to an embodiment of this application. The apparatus 1100 may be the foregoing session management network element. The apparatus 1100 includes a receiving unit 1110, configured to receive a first request message, where the first request message is used to request to establish a first session for a terminal, a processing unit 1120, configured to determine to establish the first session as an always-on session, where the always-on session is a session for which user-plane resources are activated when the terminal is transitioned from an idle mode to a connected mode, and a sending unit 1130, configured to send a first response message to the terminal, where the first response message is used to indicate that the apparatus accepts to establish the first session, the first response message carries first indication information, and the first indication information is used to indicate that the first session is an always-on session.

Optionally, the processing unit 1120 is specifically configured to determine, based on any one of the following information, to establish the first session as the always-on session subscription information of the terminal, policy information of the terminal, or local configuration information of the apparatus.

Optionally, the processing unit 1120 is specifically configured to determine, based on any one of the following information, to establish the first session as the always-on session a DNN, S-NSSAI, current location information of the terminal, or an access type of the terminal, where the DNN or the S-NSSAI is carried in the first request message.

Optionally, the local configuration information includes any one of the following information a maximum quantity of always-on sessions supported by the terminal or a maximum quantity of always-on sessions supported by the apparatus. The processing unit 1120 is specifically configured to, when a quantity of existing always-on sessions of the terminal is less than the maximum quantity of always-on sessions supported by the terminal, determine to establish the first session as the always-on session, or when a quantity of existing always-on sessions of the apparatus is less than the maximum quantity of always-on sessions supported by the apparatus, determine to establish the first session as the always-on session.

Optionally, the processing unit 1120 is further configured to, after the first response message is sent to the terminal, determine to update a session attribute of the first session, where the session attribute is used to indicate that the first session is an always-on session. The sending unit 1130 is further configured to send a notification message to the terminal, where the notification message is used to notify that the session attribute of the first session has been updated to a non-always-on session.

In another possible implementation of this application, the receiving unit 1110 is configured to receive a first request message and second indication information, where the first request message is used to request to establish the first session for the terminal, and the second indication information is used to indicate establishing the first session as an always-on session, where the always-on session is a session for which user-plane resources are activated when the terminal is transitioned from an idle mode to a connected mode.

The processing unit 1120 is configured to reject to establish the first session as an always-on session.

The sending unit 1130 is configured to send a first response message to the terminal, where the first response message carries third indication information, and the third indication information is used to instruct the apparatus to reject to establish the first session as an always-on session.

Optionally, the first response message is used to indicate that the apparatus rejects to establish the first session, and the third indication information is used to indicate that the apparatus rejects to establish the first session because the apparatus rejects to establish the first session as an always-on session. Alternatively, the first response message is used to indicate that the apparatus accepts to establish the first session, but does not accept to establish the first session as an always-on session.

Optionally, the processing unit 1120 is specifically configured to determine, based on any one of the following information, to reject to establish the first session as the always-on session subscription information of the terminal, policy information of the terminal, or local configuration information of the apparatus.

Optionally, the processing unit 1120 is specifically configured to determine, based on any one of the following information, to reject to establish the first session as the always-on session a DNN, S-NSSAI, current location information of the terminal, or an access type of the terminal, where the DNN or the S-NSSAI is carried in the first request message.

Optionally, the local configuration information includes any one of the following information a maximum quantity of always-on sessions supported by the terminal or a maximum quantity of always-on sessions supported by the apparatus. The processing unit 1120 is specifically configured to, when a quantity of existing always-on sessions of the terminal is greater than or equal to the maximum quantity of always-on sessions supported by the terminal, determine to reject to establish the first session as the always-on session, or when a quantity of existing always-on sessions of the apparatus is greater than or equal to the maximum quantity of always-on sessions supported by the apparatus, determine to reject to establish the first session as the always-on session.

Optionally, the processing unit 1120 is further configured to, after the first response message is sent to the terminal, determine to update a session attribute of the first session, where the session attribute is used to indicate that the first session is a non-always-on session. The sending unit 1130 is further configured to send a notification message to the terminal, where the notification message is used to notify that the session attribute of the first session has been updated to an always-on session.

It should be understood that, the apparatus 1100 herein is presented in a form of functional units. The term "unit" herein may be an application-specific integrated circuit (ASIC), an electronic circuit, a processor (for example, a shared processor, a dedicated processor, or a group processor) configured to execute one or more software or firmware programs, a memory, a merge logic circuit, and/or another suitable component that supports the described function. In an optional example, a person skilled in the art can understand that the apparatus 1100 may be specifically the session management network element in the foregoing method embodiments, and the apparatus 1100 may be configured to perform procedures and/or steps corresponding to the session management network element in the foregoing method embodiments. To avoid repetition, details are not described herein.

Figure 12:
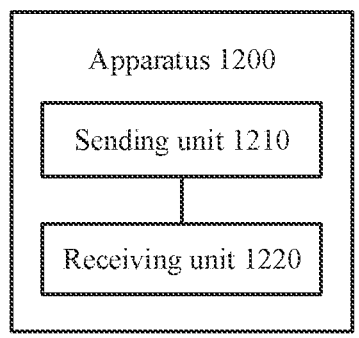
FIG. 12 is a schematic block diagram of another apparatus according to an embodiment of this application.

FIG. 12 shows an apparatus 1200 according to an embodiment of this application. The apparatus 1200 may be the foregoing terminal, or may be a chip. The apparatus 1200 includes a sending unit 1210, configured to send a first request message to a session management network element, where the first request message is used to request to establish a first session for the apparatus, and a receiving unit 1220, configured to receive a first response message, where the first response message is used to indicate that the session management network element accepts to establish the first session, the first response message carries first indication information, the first indication information is used to indicate that the first session is an always-on session, and the always-on session is a session for which user-plane resources are activated when the apparatus is transitioned from an idle mode to a connected mode.

Optionally, the receiving unit 1220 is further configured to receive a notification message, where the notification message is used to notify that a session attribute of the first session has been updated to a non-always-on session.

In another possible implementation of this application, the sending unit 1210 is configured to send the first request message and second indication information to the session management network element, where the first request message is used to request to establish the first session for the apparatus, the second indication information is used to indicate establishing the first session as an always-on session, and the always-on session is a session for which user-plane resources are activated when the apparatus is transitioned from an idle mode to a connected mode.

The receiving unit 1220 is configured to receive the first response message, where the first response message carries third indication information, and the third indication information is used to instruct the session management network element to reject to establish the first session as an always-on session.

Optionally, the first response message is used to indicate that the session management network element rejects to establish the first session, and the third indication information is used to indicate that the session management network element rejects to establish the first session because the session management network element rejects to establish the first session as an always-on session.

Alternatively, the first response message is used to indicate that the session management network element accepts to establish the first session, but does not accept to establish the first session as an always-on session.

Optionally, the receiving unit 1220 is further configured to receive a notification message, where the notification message is used to notify that a session attribute of the first session has been updated to an always-on session.

It should be understood that, the apparatus 1200 herein is presented in a form of functional units. The term "unit" herein may be an ASIC, an electronic circuit, a processor (for example, a shared processor, a dedicated processor, or a group processor) configured to execute one or more software or firmware programs, a memory, a merge logic circuit, and/or another suitable component that supports the described function. In an optional example, a person skilled in the art may understand that the apparatus 1200 may be specifically the terminal in the foregoing method embodiments, and the apparatus 1200 may be configured to perform procedures and/or steps corresponding to the terminal in the foregoing method embodiments. To avoid repetition, details are not described herein.

The apparatus 1100 and the apparatus 1200 in the foregoing solutions have functions of implementing corresponding steps performed by the session management network element and the terminal in the foregoing method. The functions may be implemented by hardware, or may be implemented by hardware by executing corresponding software. The hardware or the software includes one or more modules corresponding to the foregoing functions. For example, the sending unit may be replaced with a transmitter, the receiving unit may be replaced with a receiver, and another unit such as a determining unit may be replaced with a processor, to respectively perform a sending operation, a receiving operation, and a related processing operation in the method embodiments.

In the embodiments of this application, the apparatuses in FIG. 11 and FIG. 12 may alternatively be chips or chip systems, for example, a system on chip (SoC). Correspondingly, the receiving unit and the sending unit may be a transceiver circuit of the chip. This is not limited herein.

Figure 13:
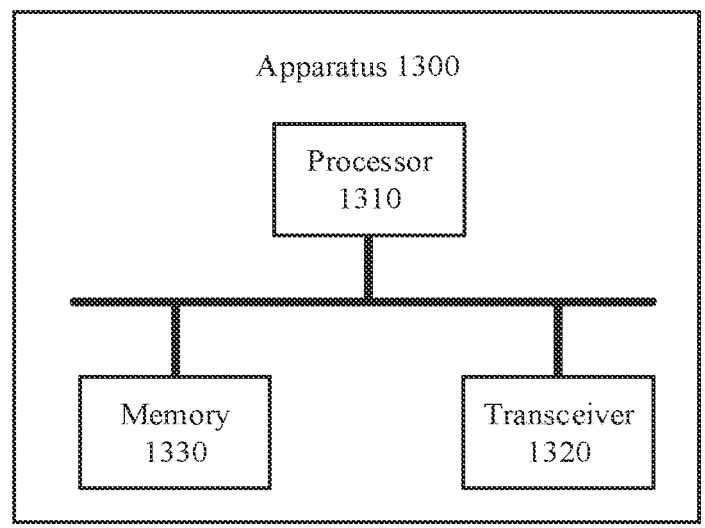
FIG. 13 is a schematic block diagram of another apparatus according to an embodiment of this application.

It should be understood that the session management network element in FIG. 11 or the terminal in FIG. 12 in the embodiments of this application may be implemented by using an apparatus 1300 in FIG. 13, and may be configured to perform the steps and/or procedures corresponding to the session management network element or the terminal in the foregoing method embodiments.

FIG. 13 shows an apparatus 1300 according to an embodiment of this application. The apparatus 1300 includes a processor 1313, a transceiver 1320, and a memory 1330. The processor 1313, the transceiver 1320, and the memory 1330 communicate with each other by using an internal connection channel. The memory 1330 is configured to store an instruction. The processor 1313 is configured to execute the instruction stored in the memory 1330, to control the transceiver 1320 to send a signal and/or receive a signal.

In a possible implementation of this application, if the communications apparatus 1300 is a session management network element, the processor 1313 is configured to receive a first request message by using the transceiver 1320, where the first request message is used to request to establish a first session for a terminal, determine to establish the first session as an always-on session, where the always-on session is a session for which user-plane resources are activated when the terminal is transitioned from an idle mode to a connected mode, and send, by using the transceiver 1320, a first response message to the terminal, where the first response message is used to indicate that the apparatus accepts to establish the first session, the first response message carries first indication information, and the first indication information is used to indicate that the first session is an always-on session.

If the communications apparatus 1300 is a terminal, the transceiver 1320 is configured to send a first request message to a session management network element by using the transceiver 1320, where the first request message is used to request to establish a first session for the apparatus, receive a first response message by using the transceiver 1320, where the first response message is used to indicate that the session management network element accepts to establish the first session, the first response message carries first indication information, the first indication information is used to indicate that the first session is an always-on session, and the always-on session is a session for which user-plane resources are activated when the apparatus is transitioned from an idle mode to a connected mode.

In another possible implementation of this application, if the communications apparatus 1300 is the session management network element, the processor 1313 is configured to receive the first request message and second indication information by using the transceiver 1320, where the first request message is used to request to establish the first session for the terminal, the second indication information is used to indicate establishing the first session as an always-on session, and the always-on session is a session for which user-plane resources are activated when the terminal is transitioned from an idle mode to a connected mode, reject to establish the first session as an always-on session, and send a first response message to the terminal by using the transceiver 1320, where the first response message carries third indication information, and the third indication information is used to instruct the apparatus to reject to establish the first session as an always-on session.

If the communications apparatus 1300 is the terminal, the transceiver 1320 is configured to send the first request message and second indication information to the session management network element by using the transceiver 1320, where the first request message is used to request to establish the first session for the apparatus, the second indication information is used to indicate establishing the first session as an always-on session, and the always-on session is a session for which user-plane resources are activated when the apparatus is transitioned from an idle mode to a connected mode, and receive a first response message by using the transceiver 1320, where the first response message carries third indication information, and the third indication information is used to indicate that the session management network element rejects to establish the first session as an always-on session.

Optionally, the memory 1330 includes a read-only memory (ROM) and a random-access memory (RAM), and provide an instruction and data to the processor. A part of the memory may further include a non-volatile RAM. For example, the memory may further store information of a device type. The processor 1313 may be configured to execute the instruction stored in the memory. In addition, when the processor 1313 executes the instruction stored in the memory, the processor 1313 is configured to perform the steps and/or procedures corresponding to the network storage network element or the mobility management network element in the foregoing method embodiments.

It should be understood that the transceiver may include a transmitter and a receiver. The transceiver may further include an antenna. There may be one or more antennas. The memory may be a separate component, or may be integrated in the processor. Each of the foregoing components or some components may be integrated in a chip for implementation, for example, integrated in a baseband chip for implementation.

In this embodiment of this application, the transceiver in FIG. 13 may alternatively be a communications interface. This is not limited herein.

In the embodiments of this application, for ease of understanding, a plurality of examples are used for description. However, these examples are merely examples, but it does not mean that these examples are best implementations for implementing this application.

In the embodiments of this application, for ease of description, a request message, a response message, and names of various other messages are used. However, these messages are merely used as examples to describe content that needs to be carried or an implemented function. Specific names of the messages constitute no limitation on this application. For example, the messages may be a first message, a second message, and a third message. These messages may be some specific messages, or may be some fields in the messages. These messages may alternatively represent various service operations.

It should be understood that, the processor in the foregoing apparatus in the embodiments of this application may be a central processing unit (CPU), or may further be another general purpose processor, a digital signal processor (DSP), an ASIC, a field-programmable gate array (FPGA), or another programmable logic device, discrete gate or transistor logic device, discrete hardware component, or the like. The general-purpose processor may be a microprocessor, or the processor may be any conventional processor or the like.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software unit. A software unit may be located in a mature storage medium in the art, such as a RAM, a flash memory, a ROM, a programmable ROM, an electrically erasable programmable memory, a register, or the like. The storage medium is located in the memory, and a processor executes instructions in the memory and completes the steps in the foregoing methods in combination with hardware of the processor. To avoid repetition, details are not described herein again.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in an embodiment. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a session management network element and comprising:
   receiving a request message requesting establishment of a session for a terminal as an always-on session;
   making a first determination to reject establishment of the session as the always-on session;
   sending, to the terminal and in response to the request message and the first determination, a response message indicating acceptance of establishment of the session as a non-always-on session and rejection of establishment of the session as the always-on session;
   making a second determination to update a session attribute of the session from non-always-on to always-on; and
   sending, to the terminal and in response to the second determination, a notification message notifying of the update.

2. The method of claim 1, further comprising further making the first determination based on subscription information of the terminal, policy information of the terminal, or local configuration information of the session management network element.

3. The method of claim 2, wherein the local configuration information comprises a first maximum quantity of always-on sessions supported by the terminal or a second maximum quantity of always-on sessions supported by the session management network element.

4. The method of claim 3, further comprising further making the first determination when a quantity of existing always-on sessions of the terminal is greater than or equal to the first maximum quantity.

5. The method of claim 3, further comprising further making the first determination when a quantity of existing always-on sessions of the session management network element is greater than or equal to the second maximum quantity.

6. The method of claim 1, further comprising further making the first determination based on a data network name (DNN) in the request message, single network slice selection assistance information (S-NSSAI) in the request message, current location information of the terminal, or an access type of the terminal.

7. The method of claim 3, further comprising further making the second determination when the subscription information, the policy information, or the local configuration information changes.

8. The method of claim 1, wherein the response message comprises indication information indicating the rejection.

9. The method of claim 1, wherein the first-request message is a protocol data unit (PDU) session establishment request message, and wherein the response message is a PDU session establishment response message.

10. A session management network element comprising:
    a non-transitory computer-readable storage medium configured to store instructions, and
    a processor coupled to the non-transitory computer-readable storage medium and configured to execute the instructions to cause the session management network element to:
    receive a request message requesting establishment of a session for a terminal as an always-on session;
    make a first determination to reject establishment of the session as the always-on session;
    send, to the terminal and in response t the request message and the first determination, a response message indicating acceptance of establishment of the session as a non-always-on session and rejection of establishment of the session as the always-on session;
    make a second determination to update a session attribute of the session from non-always-on to always-on; and
    send, to the terminal and in response to the second determination, a notification message notifying of the update.

11. The session management network element of claim 10, wherein the processor is further configured to execute the instructions to cause the session m re it network element to further make the first determination based on subscription information of the terminal, policy information of the terminal, or local configuration information of the session management network element.

12. The session management network element of claim 11, wherein the local configuration information comprises a first maximum quantity of always-on sessions supported by the terminal or a second maximum quantity of always-on sessions supported by the session management network element.

13. The session management network element of claim 12, wherein the processor is further configured to execute the instructions to cause the session management network element to further make the first determination when a quantity of existing always-on sessions of the terminal is greater than or equal to the first maximum quantity.

14. The session management network element of claim 12, wherein the processor is further configured to execute the instructions to cause the session management network element to further make the first determination when a quantity of existing always-on sessions of the session management network element is greater than or equal to the second maximum quantity.

15. The session management network element of claim 10, wherein the response message comprises indication information indicating the rejection.

16. A method comprising:
    sending, by a mobility management network, element and to a session management network element, a request message requesting establishment of a session for a terminal as an always-on session;
    making, by the session management network element, a first determination to reject establishment of the first session as the always-on session;
    sending, by the session management network element, to the mobility management network element, and in response to the request message and the first determination, a response message indicating acceptance of establishment of the session as a non-always-on session and rejection of establishment of the session as the always-on session;
    making, by the session management network element, a second determination to update a session attribute of the session from non-always-on to always-on; and
    sending, by the session management network element, to the mobility management network element, and in a response to the second determination, a notification message notifying of the update.

17. The method of claim 16, further comprising further making, by the session management network element, the first determination based on subscription information of the terminal, policy information of the terminal, or local configuration information of the session management network element.

18. The method of claim 17, wherein the local configuration information comprises a first maximum quantity of always-on sessions supported by the terminal or a second maximum quantity of always-on sessions supported by the session management network element.

19. A session management system comprising:
    a mobility management network element configured to send a request message requesting establishment of a session for a terminal as an always-on session; and
    a session management network element configured to:
    receive, from the mobility management network element, the request message;
    make a first determination to reject establishment of the session as the always-on session;
    send, to the mobility management network element and in response to the request message and the first determination response message indicating acceptance of establishment of the session as a non-always-on session and rejection of establishment of the session as the always-on session;
    make a second determination to update a session attribute of the session from non-always-on to always-on; and
    send, to the mobility management network element and in response to the second determination, a notification message notifying of the update.

20. The session management system of claim 19, wherein the session management network element is further configured to further make the first determination based on subscription information of the terminal, policy information of the terminal, or local configuration information of the session management network element.

21. The session management system of claim 20, wherein the local configuration information comprises a first maximum quantity of always-on sessions supported by the terminal or a second maximum quantity of always-on sessions supported by the session management network element.

* * * * *

UNITED STATES PATENT AND TRADEMARK OFFICE
CERTIFICATE OF CORRECTION

| | | |
|---|---|---|
| PATENT NO. | : 12,356,491 B2 | Page 1 of 1 |
| APPLICATION NO. | : 17/994649 | |
| DATED | : July 8, 2025 | |
| INVENTOR(S) | : Lin Shu and Chengchen Zhang | |

It is certified that error appears in the above-identified patent and that said Letters Patent is hereby corrected as shown below:

In the Claims

Claim 9, Column 51, Line 18: "wherein the first-request" should read "wherein the request"

Claim 10, Column 51, Line 24: "instructions, and" should read "instructions; and"

Claim 10, Column 51, Line 33: "response t the request" should read "response to the request"

Claim 11, Column 51, Line 47: "session m re it network" should read "session management network"

Claim 16, Column 52, Line 8: "network, element and" should read "network element and"

Claim 19, Column 52, Line 52: "determination response message" should read "determination, a response message"

Claim 19, Column 52, Lines 52-53: "acceeptance" should read "acceptance"

Signed and Sealed this
Fourteenth Day of October, 2025

John A. Squires
*Director of the United States Patent and Trademark Office*